United States Patent
Aoyama

(10) Patent No.: US 7,554,525 B2
(45) Date of Patent: Jun. 30, 2009

(54) SETTING NEXT DESTINATION OF POINTER TO EACH OF MULTIPLE OBJECTS

(75) Inventor: Koji Aoyama, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 609 days.

(21) Appl. No.: 11/420,080

(22) Filed: May 24, 2006

(65) Prior Publication Data

US 2006/0277502 A1      Dec. 7, 2006

(30) Foreign Application Priority Data

May 25, 2005      (JP)      ............................ P2005-153123

(51) Int. Cl.
*G06F 3/033*      (2006.01)

(52) U.S. Cl. ........................ 345/157; 345/156; 345/168; 715/802; 715/856; 715/860

(58) Field of Classification Search ......... 345/156–162, 345/168–172; 715/767, 802, 856–862
See application file for complete search history.

(56) References Cited

U.S. PATENT DOCUMENTS

| | | | | |
|---|---|---|---|---|
| 6,034,689 A * | 3/2000 | White et al. | ................. | 715/854 |
| 6,133,905 A * | 10/2000 | Edo et al. | .................... | 345/156 |
| 6,166,739 A * | 12/2000 | Hugh | ......................... | 715/854 |
| 6,622,306 B1 * | 9/2003 | Kamada | ...................... | 725/109 |
| 6,862,598 B2 * | 3/2005 | Higashigawa | ............... | 707/100 |
| 6,892,360 B1 * | 5/2005 | Pabla et al. | .................. | 715/802 |
| 7,046,246 B2 * | 5/2006 | Saitou | ......................... | 345/440 |
| 2002/0178142 A1 | 11/2002 | Higashigawa | | |
| 2005/0004917 A1 * | 1/2005 | Ueda et al. | ................... | 707/100 |
| 2005/0212768 A1 * | 9/2005 | Toda et al. | ................... | 345/162 |
| 2006/0277503 A1 * | 12/2006 | Maehiro et al. | ............. | 715/856 |

FOREIGN PATENT DOCUMENTS

JP      5-150903      6/1993

(Continued)

OTHER PUBLICATIONS

English Language Abstract of JP 6-131119, May 13, 1994.

(Continued)

*Primary Examiner*—Regina Liang
*Assistant Examiner*—Jason M Mandeville
(74) *Attorney, Agent, or Firm*—Greenblum & Bernstein, P.L.C.

(57) ABSTRACT

A menu screen includes multiple buttons. Assigned to each button for each direction is another button to which an anchor is moved according to a directional user input of up, down, right or left. A button B and a button C both located downstream of a button A are candidates to which the anchor is moved when the down direction key is input with the anchor pointing to the button A. Scores of positional relationships of the position between points of the shortest distance from an anchor position of the button A within the range of the button B and the button C to the anchor position are calculated. According to the calculated scores, the next destination of the anchor when the down direction key is input with the anchor pointing to the button A is set to either button B or button C.

25 Claims, 10 Drawing Sheets

FOREIGN PATENT DOCUMENTS

| | | |
|---|---|---|
| JP | 6-131119 | 5/1994 |
| JP | 9-081322 | 3/1997 |
| JP | 9-311760 | 12/1997 |
| JP | 10-301717 | 11/1998 |
| JP | 2000-357040 | 12/2000 |
| JP | 2001-202526 | 7/2001 |
| JP | 2002-288223 | 10/2002 |
| JP | 2003-157172 | 5/2003 |
| WO | 98/12871 | 3/1998 |

OTHER PUBLICATIONS

English Language Abstract of JP 9-081322, Mar. 28, 1997.
English Language Abstract of JP 10-301717, Nov. 13, 1998.
U.S. Appl. No. 11/420,334 to Kazutoyo Maehiro et al., filed May 25, 2006.
English language Abstract of JP 2001-202526, Jul. 27, 2001.
English language Abstract of JP 5-150903, Jun. 18, 1993.
English language Abstract of JP 9-311760, Dec. 2, 1997.
English language Abstract of JP 2002-288223, Oct. 4, 2002.
English language Abstract of JP 2000-357040, Dec. 26, 2000.
English language Abstract of JP 2003-157172, May 30, 2003.

* cited by examiner

SETTING NEXT DESTINATION OF POINTER TO EACH OF MULTIPLE OBJECTS

CROSS REFERENCE TO RELATED APPLICATION

The present disclosure relates to subject matter contained in Japanese Patent Application No. 2005-153123, filed on May 25, 2005, the disclosure of which is expressly incorporated herein by reference in its entirety.

BACKGROUND OF THE INVENTION

1. Field of the Invention

The present invention relates to a technology for setting another object to be a next destination of a pointer when the pointer sequentially moves according to a user operation.

2. Description of the Related Art

With digital home electronics incorporating an information processing device, a user uses a menu screen to select a desired process. Generally, such a menu screen includes multiple objects associated with respective processes. As the user selects one of multiple objects, a process associated with the selected object is executed. The user can select a desired process in accordance with the menu screen.

Used in a game machine which plays a video game (in particular, a role playing game) is a world map for selecting a game scene (e.g., a virtual city in the world of the game) where the game is played. Being used by a user for selecting a desired game scene from multiple game scenes, the world map has a nature of a kind of a menu screen. Game scenes displayed on the world map are objects to be selected by the user.

Methods that allow a user to select a desired object from multiple objects included in the menu screen include a method by which a coordinate position corresponding to a desired object is input on a display device with a mouse or through a touch panel. However, an input device capable of directly inputting a coordinate position, such as a mouse or a touch panel, cannot be adapted to portable type game machines and cellular phones which have a capability of a computer device. An input device which is capable of inputting coordinates of a position irrelevant to an object may sometimes not be so useful even when this type of input device can be adapted to a computer device.

Computer devices (particularly, those which cannot use an input device capable of directly inputting a coordinate position) adopt a method that allows a user to select a desired object by moving a pointer (cursor) among multiple objects included in a menu screen. When a set input is made through an input device by the user, a process associated with an object pointed to is executed. The pointer is movable among multiple objects with the manipulation of up, down, right and left direction keys equipped on the input device. An issue in this case is how to move the pointer in response to input direction data.

Japanese Patent Laid-Open Publication No. H6-131119 (hereinafter, publication 1) discloses that the position of the pointer (cursor) is moved in a direction input through an input device (joystick 16) if there is another object in the input direction with respect to an object (functional button) currently pointed to by the pointer. Japanese Patent Laid-Open Publication No. H10-301717 (hereinafter, publication 2) discloses that the position of a pointer is moved to an object within a predetermined angle to a direction input through the input device with respect to an object (link place) currently pointed to with a pointer (cursor). According to both publication 1 and publication 2, the next destination of the pointer is determined after a directional input is made through the input device.

Japanese Patent Laid-Open Publication No. H9-81322 (hereinafter, publication 3) describes that positional data (object number) of a next destination of a pointer (cursor) is prestored for each object. When a directional input is made through the input device, the position of the pointer is moved in accordance with positional data stored for an object currently pointed to by the pointer. According to publication 3, the next destination of the pointer is predetermined before a directional input is made through the input device.

According to publication 1, as it is premised that multiple buttons are regularly arranged upward, downward, rightward, and leftward (see, FIG. 4 of publication 1), it is easy to determine whether or not there is another object present in a direction input through the input device with respect to an object currently pointed to by the pointer. It is not, however, always true that available objects are regularly arranged upward, downward, rightward, and leftward. For example, the aforementioned world map of a game often has available objects arranged irregularly to provide a mode where a city to be a game scene is laid out on a map from a viewpoint that provides easier visual recognition for users.

The technology of publication 1 cannot be directly applied to a menu screen which has objects arranged irregularly, According to publication 2, an object within a predetermined angle to a direction input through the input device with respect to the current position of the pointer is selected, The technology of publication 2 can be applied to a menu screen on which objects are arranged up, down, right, and left with irregular positional relationships.

However, according to publication 2, an object with the shortest distance among objects within a predetermined angle is selected. Accordingly, the pointer does not move to an object completely matching an input direction from the current position of the pointer, so that the pointer may move to an object near the boundary of the range of the predetermined angle. In a case where inputs in the same direction (or, the opposite direction) are repeated multiple times, the position of the pointer may move to an object in an irrelevant direction from the position where the pointer has been displayed before the first input. According to the technology of publication 2, the pointer may move against the user's intentions The technology of publication 2 may generate an object to which the pointer is never moved no matter what sequence directional inputs are made through the input device, depending on positional relationships of the objects irregularly arranged up, down, right, and left. In publication 2, however, no measures have been considered for such a case. Because it is premised that multiple objects are irregularly arranged up, down, right, and left in publication 1, there are no objects to which the pointer cannot be moved, so that no measures have been considered for such a case at all.

According to publication 3, the position of the pointer is moved in accordance with positional data of a next destination stored beforehand, The technology of publication 3 can be applied to a menu screen which has multiple objects irregularly arranged up, down, right, and left. If positional data prestored for each object is appropriately selected, it is possible to avoid the problem of generating objects to which the pointer cannot be moved.

However, in publication 3, no consideration is taken on how to set prestored positional data. Manual setting of all positional data requires an inordinate amount of work by a developer, If the technology of publication 3 is combined with the technology of publication 2, the developer is released from the bothersome work for setting positional data to some extent. However, when a problem such that the pointer does not move as the user intends or the pointer moves to an object when it should not be moved, the developer should set positional data to avoid such a problem,

SUMMARY OF THE INVENTION

Accordingly, it is an object of the invention to provide a next destination information setting method or the like which can easily and appropriately set the next destination of a pointer at the time of generating a screen including multiple objects that the pointer sequentially moves to in accordance with the operation of a user.

A next destination information setting method according to the first aspect of the invention sets next destination information indicating another object that is a predetermined next destination of a pointer that moves in a two dimensional space, defined by coordinates (x, y) of an x-y coordinate system, to objects having display positions in the two dimensional space. The other object is selected by a user with the pointer in response to input in a positive x direction, a negative x direction, a positive y direction, or a negative y direction.

The next destination information setting method calculates scores of positional relationships in each of the positive x direction, negative x direction, positive y direction, and negative y direction between a predetermined object among the objects and each object other than the predetermined object, in accordance with coordinates of the predetermined object and coordinates of each object other than the predetermined object. The next destination information setting method sets next destination information in each of the positive x direction, negative x direction, positive y direction, and negative y direction for the predetermined object in accordance with a direction from the predetermined object to each object other than the predetermined object, and the calculated scores of the positional relationships in each of the positive x direction, negative x direction, positive y direction, and negative y direction.

Given that a difference between an x coordinate of the predetermined object and an x coordinate of a selected other object is dx, and a difference between a y coordinate of the predetermined object and a y coordinate of the selected other object is dy, the scores of the positional relationships are calculated from an equation 1:

$$\alpha \times f(dx) + \beta \times f(dy) \qquad (1)$$

where f(k) is a function of k, $\alpha$ and $\beta$ are constants, and a magnitude correlation between $\alpha$ and $\beta$ is inverted when a score of a positional relationship in the positive x direction or the negative x direction is calculated and when a score of a positional relationship in the positive y direction or the negative y direction is calculated.

After the next destination information of the positive x direction, the negative x direction, the positive y direction, and the negative y direction is set to the predetermined object by the above method, as an input in the positive x direction, the negative x direction, the positive y direction, or the negative y direction is made by the user with the pointer positioned at the predetermined object, the position of the pointer moves to another object indicated by the next destination information corresponding to the input destination. Even if the objects are not arranged regularly in the x direction and the y direction, the pointer moves in accordance with the input in the positive x direction, the negative x direction, the positive y direction, or the negative y direction.

The next destination information of the positive x direction, the negative x direction, the positive y direction, and the negative y direction set to the predetermined object is set in accordance with the scores of the positional relationships calculated by the difference dx of x coordinates between the predetermined object and a selected other object, and the difference dy of their y coordinates, The scores of the positional relationships are calculated by weighing the function f(dx) of the difference dx of the x coordinate and the function f(dy) of the difference dy of the y coordinate in accordance with the x direction or the y direction.

Accordingly, in a case where any directional input is made with the pointer positioning at the predetermined object, the pointer moves to another object which lies in a direction near the input direction, and the movement of the pointer can be performed as close to the user's intention as possible such that the pointer does not move to another object in which the direction is near but the position is far. Because the next destination information in each of the positive x direction, the negative x direction, the positive y direction, and the negative y direction is set to the predetermined object in accordance with the scores of the positional relationships, a developer does not need to do a bothersome work like manual setting of the next destination information.

A next destination information setting device according to the second aspect of the invention sets next destination information indicating another object that is a predetermined next destination of a pointer that moves in a two dimensional space, defined by coordinates (x, y) of an x-y coordinate system, to objects having display positions in the two dimensional space. The other object is selected by a user with the pointer in response to input in a positive x direction, a negative x direction, a positive y direction, or a negative y direction.

The next destination information setting device has a score calculator which calculates scores of positional relationships in each of the positive x direction, negative x direction, positive y direction, and negative y direction between a predetermined object among the objects and each object other than the predetermined object, in accordance with coordinates of the predetermined object and coordinates of each object other than the predetermined object. The next destination information setting device also has a positional information setter which sets next destination information in each of the positive x direction, negative x direction, positive y direction, and negative y direction for the predetermined object in accordance with a direction from the predetermined object to each object other than the predetermined object, and the calculated scores of the positional relationships in each of the positive x direction, negative x direction, positive y direction, and negative y direction.

Given that a difference between an x coordinate of the predetermined object and an x coordinate of a selected other object is dx, and a difference between a y coordinate of the predetermined object and a y coordinate of the selected other object is dy, The score calculation section calculates the scores of the positional relationships from an equation 2:

$$\alpha \times f(dx) + \beta \times f(dy) \qquad (2)$$

where f(k) is a function of k, $\alpha$ and $\beta$ are constants, and a magnitude correlation between $\alpha$ and $\beta$ is inverted when a score of a positional relationship in the positive x direction or the negative x direction is calculated and when a score of a positional relationship in the positive y direction or the negative y direction is calculated.

A next destination information setting device according to the third aspect of the invention sets next destination information indicating another object that is a predetermined next destination of a pointer that moves in a two dimensional space, defined by coordinates (x, y) of an x-y coordinate system, to objects having display positions in the two dimensional space. The other object is selected by a user with the pointer in response to input in a positive x direction, a negative x directions a positive y direction, or a negative y direction.

The next destination information setting device has a program memory which stores a program, and a processor which runs the program.

The program has a calculating code section that calculates scores of positional relationships in each of the positive x direction, the negative x direction, the positive y direction, and the negative y direction between a predetermined object among the objects and each object other than the predetermined object, in accordance with coordinates of the predetermined object and coordinates of each object other than said predetermined object.

The program also has a setting code section that sets next destination information in each of the positive x directions negative x direction, the positive y direction, and the negative y direction for the predetermined object in accordance with a direction from the predetermined object to each object other than the predetermined object, and the calculated scores of the positional relationships in each of the positive x direction, the negative x direction, the positive y direction, and the negative y direction.

Given that a difference between an x coordinate of said predetermined object and an x coordinate of a selected other object is dx, and a difference between a y coordinate of said predetermined object and a y coordinate of the selected other object is dy, the calculating code section calculates the scores of the positional relationships from an equation 3:

$$\alpha \times f(dx) + \beta \times f(dy) \quad (3)$$

where f(k) is a function of k, α and β are constants, and a magnitude correlation between α and β is inverted when a score of a positional relationship in the positive x direction or the negative x direction is calculated and when a score of a positional relationship in the positive y direction or the negative y direction is calculated.

A program to be stored in the program memory of the next destination information setting device according to the third aspect can be distributed in the form of a computer-readable recording medium where the program is recorded. The computer-readable recording medium may be constructed in such a manner as to be mountable to and dismountable from a computer apparatus, and may be provided separate from the computer apparatus. The computer-readable recording medium may be a fixed disk drive or the like which is installed inside a computer apparatus and is provided together with the computer apparatus.

DETAILED DESCRIPTION OF THE PREFERRED EMBODIMENTS

The first embodiment of the present invention will be explained with reference to FIG. 1 through 9.

Figure 1:
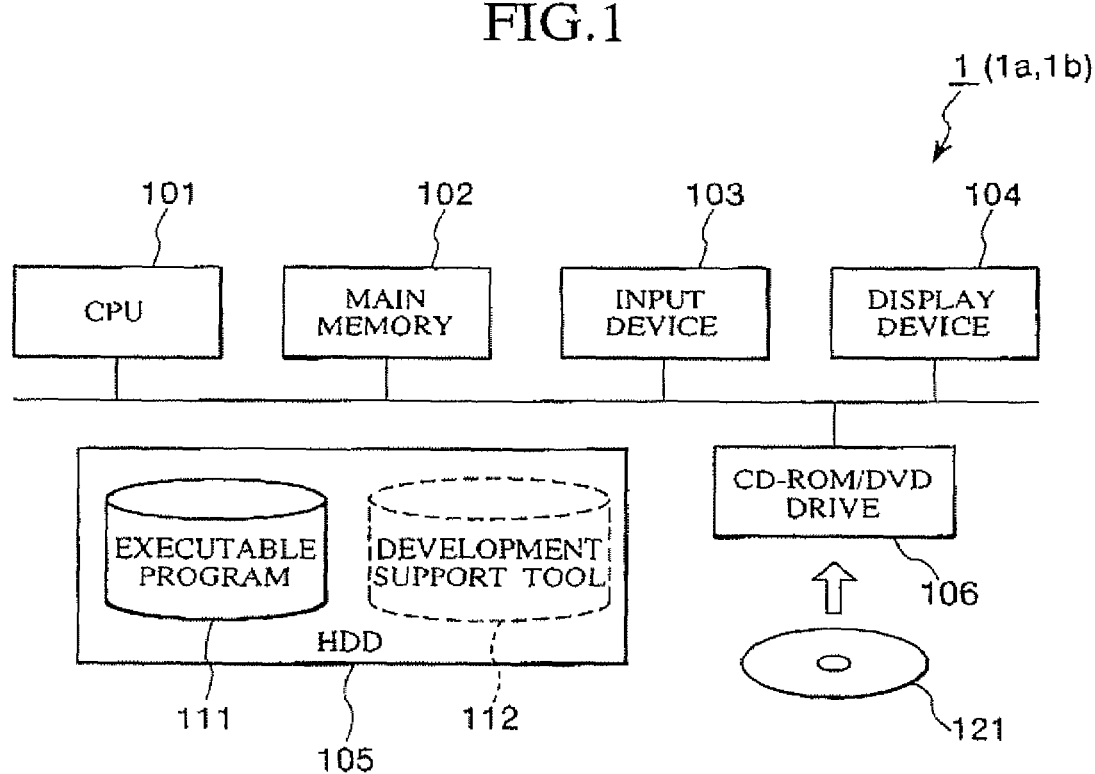
FIG. 1 is a block diagram illustrating an exemplary structure of a computer device used according to a first embodiment of the invention.

FIG. 1 is a block diagram of an exemplary computer device to which the first embodiment is applied. Two kinds of computer devices 1 such as a development model 1a and a user model 1b are used in the embodiment, and their hardware structures are substantively the same. The development model 1a executes a development support tool 112, and creates an executable program 111. The development model 1a can run the executable program 111. Only the executable program 111 is installed on the user model 1b, and the development support tool 112 is not installed on the user model 1b. The development model 1a may be used as the user model 1b. The user model may or may not be used as the development model 1a.

The computer device 1 (including the development model 1a and the user model 11b) comprises a CPU 101, a main memory 102, an input device 103, a display device 104, a Hard Disk Drive (HDD) 105, and a CD-ROM/DVD drive 106. The development model 1a stores the development support tool 112 in the HDD 105, and the executable program 111 created by the development support tool 111 is also stored in the HDD 111. In a case of the user model 1b, only the executable program 111 is stored in the HDD 105. The CD-ROM/DVD drive 106 of the development model 1a can read out data from a recording medium 121, and write data in the recording medium 121. The CD-ROM/DVD drive 106 of the user model 1b may not write data in the recording medium 121.

The CPU 101 transfers the executable program 111 or the development support tool 112 both stored in the HDD 105 to the main memory 102, and runs the program transferred to the main memory 102. The main memory 102 is used as a memory area for the program transferred from the HDD 105, and a temporary memory area (work area) for data when the CPU 101 runs a program.

The input device 103 inputs instructions from the developer or the user of the executable program 111 to the CPU 101. The input device 103 of each of the development model 1a and object model 1b has four direction keys for inputting up, down, right, and left directions, a Set key for performing "Set input", a forward key and a backward key. In a case where an ASCII keyboard is used as the input device 103, for example, an ENTER key, a TAB key, and SHIFT+TAB keys are respectively allocated to the Set key, the forward 8cy, and the backward key. The input device 103 of at least the development model 1a includes a mouse.

Figure 2:
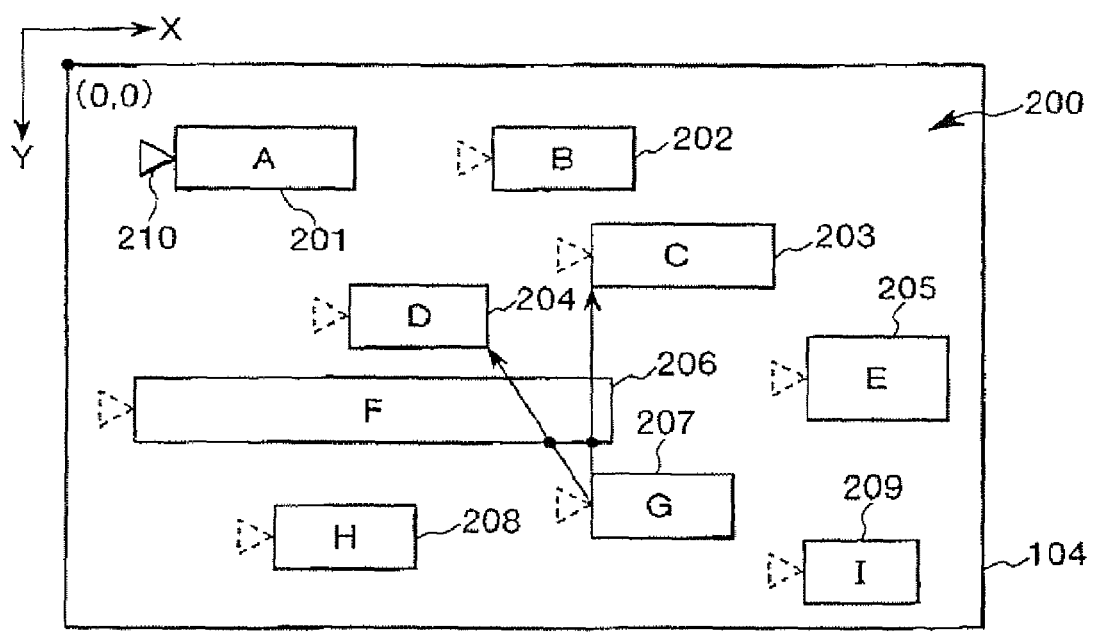
FIG. 2 is a diagram illustrating an exemplary menu screen which is displayed on a display device as an executable program is run according to the first embodiment of the invention.

The display device 104 displays information like a menu screen 200 illustrated in FIG. 2 under the control of the CPU 101. The display device 104 of the development model 1a can display a menu screen 200 under development. The HDD 105 is used as the memory area of the executable program 111 and development support tool 112, and a swap area of the main memory 102. In the development model 1a, the development support tool 112 is read out from the recording medium 121 by the CD-ROM/DVD drive 106, and stored in the HDD 105. As the CPU 101 executes the development support tool 112, the executable program 111 is created and stored in the HDD 105.

The executable program 111 created by the development model 1a and stored in the HDD 105 is written in the recording medium 121 by the CD-ROM/DVD) drive 106. The recording medium where the executable program 111 is written is used for distribution of the program to be run by the user model 1b. In the user model 1b, the executable program 111 is read out by the CD-ROM/DVD drive 106, and stored in the HDD 105.

FIG. 2 is a diagram illustrating the menu screen 200 displayed on the display device 104 as the executable program 111 is run. Regardless of whether or not displayed information is the menu screen 200, a position indicated on the display device 104 is indicated by an X coordinate and a Y coordinate of the two-dimensional orthogonal coordinate system. The pixel at the upper left corner of the display device 104 has coordinates (0,0). For other pixels, one pixel corresponds to one pair of coordinates. The right and left direction on the display device 104 is the X-axial direction. The right direction is the positive X direction, and the left direction is the negative X direction. The up and down direction on the display device 104 is the Y-axial direction. The down direction is the positive Y direction, and the up direction is the negative Y direction.

As illustrated in FIG. 2, the menu screen 200 includes multiple buttons 201 to 209 to which different processes are assigned. The buttons 201 to 209 can be arranged at arbitrary positions in the menu screen 200, and may be arranged with irregular positional relationships as illustrated in FIG. 2. The sizes of the buttons 201 to 209 in the menu screen 200 may be set arbitrarily. Any of the buttons 201 to 209 is pointed to by an anchor (cursor) 210 which is a triangular pointer. For example, when the anchor 210 points to the button 201, the position of the right vertex of the triangular anchor 210 corresponds to the middle point of the left side of the button 201. The same is true of the anchor 210 pointing to the buttons 202 to 209.

The user can move the position of the anchor 210 among the buttons 201 to 209 by the manipulation of the up, down, right, and left keys, the forward key and the backward key. When the forward key is manipulated, the anchor 210 moves from left to right, up to down, in that order. When the backward key is pressed, the anchor 210 moves from right to left, down to up, in that order. That is, in a case where the forward key or backward key is manipulated, the order of the buttons 201 to 209 to be pointed to by the anchor 210 is determined in accordance with the display positions of the buttons 201 to 209.

When the up, down, right and left keys are manipulated, the position of the anchor 210 moves in accordance with up, down, right, and left links (to be discussed later) defined for a button where the anchor 210 currently positions. When the Set key is manipulated, a process jumps to a process routine allocated to a button where the anchor 210 positions from a display process routine of the menu screen 200. The menu screen 200 is an entrance screen for the user to select a desired process. For example, when the executable program 111 is a game program, a world map arranges multiple cities which are game scenes corresponding to the menu screen 200. Individual cities arranged on the world map correspond to the individual buttons.

Figure 3:
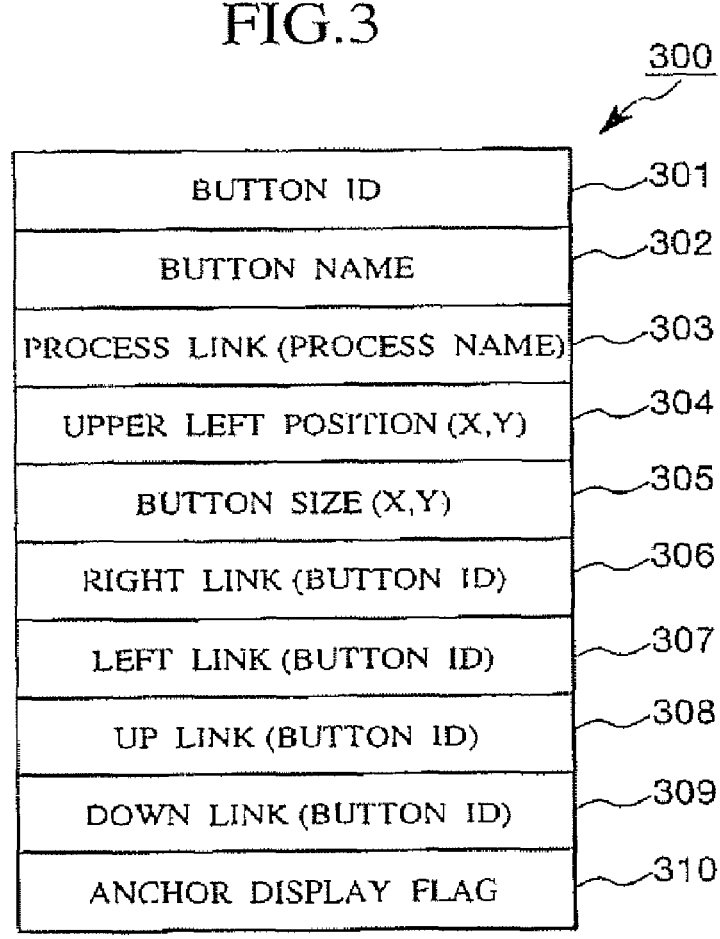
FIG. 3 is a diagram illustrating an exemplary data structure of each button included in a menu screen according to the first embodiment of the invention.

FIG. 3 is a diagram illustrating an exemplary data structure of each of the buttons 201 to 209 included in the menu screen 200 of FIG. 2. This data is prepared for each of the buttons 201 to 209 included in the menu screen 200, and hereinafter called button data 300. The button data 300 is included in the executable program 111. As illustrated in the figure, the button data 300 includes a button ID 301, a button name 302, a process link 303, an upper left position 304, a button size 305, a right link 306, a left link 307, an up link 308, a down link 309, and an anchor display flag 310.

The button ID 301 is identification information to specifically identify each of the buttons 201 to 209. The button name 302 is the name of the button, and a name inscribed here is displayed on an area inside a button in the menu screen 200. The process link 303 indicates a process routine to be jumped to from a display process of the menu screen 200, when an input is made through the Set key of the input device 103 with the anchor 210 pointing to the corresponding button, by a name allocated to a corresponding process routine.

When a new button is added to the menu screen 200, inputs of the button name 302 and process link 303 are required. As the button name 302 and the process link 303 are input, a button ID 301 is automatically given to a newly added button. Even if the button data 300 is under development, the button data 300 always includes the button ID 301, the button name 302, and the process link 303.

The upper left position 304 is the X coordinate and the Y coordinate of the upper left position when the button is displayed on the display device 104. The button size 305 indicates the length of the button in the X direction and the length thereof in the Y direction. Provided that all buttons 201 to 209 are defined to have the same size, the button size 305 need not be included in the button data 300 for the individual buttons as long as a button size common to all the buttons 201 to 209 is included as data in the executable program 111. The shape of each button 201 to 209 can be rectangular having sides with lengths defined by the button size 305 with the upper left position 304 as the upper left vertex when the menu screen 200 is displayed on the display device 104.

The position of the anchor 210 pointing to the button can be defined by the upper left position 304 and the button size 305 in the Y direction both included in the button data 300. The order of the buttons 201 to 209 to be pointed to by the anchor 210 when the forward key or the backward key is manipulated is defined in accordance with the upper left positions 304 of the individual buttons. A button having a smaller Y coordinate of the upper left position 304, and if the Y coordinate is the same, smaller X coordinate of the upper left position 304 becomes a higher order button. When the forward key is manipulated, the position of the anchor 210 is moved from a higher order button to a lower order button, and moves from the lowest order button to the highest order button. When the backward key is manipulated, the position of the anchor 210 moves from a lower order button to a higher order button, and moves from the highest order button to the lowest order button.

The right link 306 indicates another button to which the position of the anchor 210 will be shifted as the button ID of a next destination button when an input from a right direction key of the input device 103 is made with a button being pointed to by the anchor 210. Likewise, the left link 307, the up link 308, and the down link 309 indicate links to other buttons to which the anchor 210 will be shifted as the button IDs of the next destination buttons when inputs from a left direction key, an up direction key, and a down direction key are respectively made. The anchor display flag 310 is set when the button is pointed to by the anchor 210.

In the button data 300 included in the executable program 111 to be run by the user model 1b, the right link 306, the left link 307, the up link 308 and the down link 309 are already set. However, as will be discussed later, depending on the positions and sizes of the buttons 201 to 209, there may be buttons 201 to 209 that some but not all of the right link 306, left link 307, up link 308, and down link 309 are set in the button data 300.

In the button data 300 of the buttons 201 to 209 of the executable program 111, the right link 306, the left link 307, the up link 308 and the down link 309 are not necessarily initially set. The right link 306, the left link 307, the up link 308 and the down link 309 are set to individual button data 300 of the buttons 201 to 209 by running the development support tool 112 in the development model 1a.

When the development model 1a develops the executable program 111 the upper left position 304 and the button size 305 are both set for each of the buttons 201 to 209 included in the menu screen 200 by the developer. As the upper left position 304 and the button size 305 are set to each of the buttons 201 to 209, the development support tool 112 automatically sets the right link 306, left link 307, up link 308 and down link 309 of each button, and creates the executable program 111. As the developer changes the upper left position 304 and/or the button size 305 of any of the buttons 201 to 209, the development support tool 112 once again sets the right link 306, the left link 307, the up link 308, and the down link 309 of each button. The setting method of the right link 306, the left link 307, the up link 308, and the down link 309 by the development support tool 112 will be discussed later.

In a case where the right link 306, left link 307, up link 308 and down link 309 of each of the buttons 201 to 209 are set in accordance with only the upper left position 304 and the button size 305, a button to which the anchor 210 is not moved no matter what order the up, down, right and left keys of the input device 103 are manipulated may be generated. Detail of the scheme of resetting the right link 306, the left link 307, the up link 308, and the down link 309 in a case where a button to which the anchor 210 is not moved merely by the manipulation of the direction keys is generated will be explained later.

The right link 306, the left link 307, the up link 308, and the down link 309 all included in the button data 300 may be set for all or some of the buttons 201 to 209 by manual manipulation of the input device 103 by the developer. When the right link 3067 the left link 307, the up link 308 and/or the down link 309 are manually set beforehand, they will not be automatically set by the development support tool 112. The developer may manipulate the input device 103 to manually set and change the right link 306, the left link 307, the up link 308, and/or the down link 309 after those links are automatically set to each of the buttons 201 to 209.

Explanation will be given of the scheme of setting and changing the right link 306, the left link 307, the up link 308 and down link 309 in a case where a button to which the anchor 210 is not moved merely by the manipulations of the direction keys is generated. A button to which the anchor 210 is not moved by manipulations of the direction keys is a button which is not set as the next destination button of the anchor 210 at any of the right link 306, left link 307, up link 308 and down link 309 of all of the other buttons. Therefore, if the button is defined as the next destination button of the anchor 210 at the right link 306, left link 307, up link 308, or down link 309 of any of other buttons, the button becomes a button to which the anchor 210 will be moved by manipulations of the direction keys.

Figure 4:
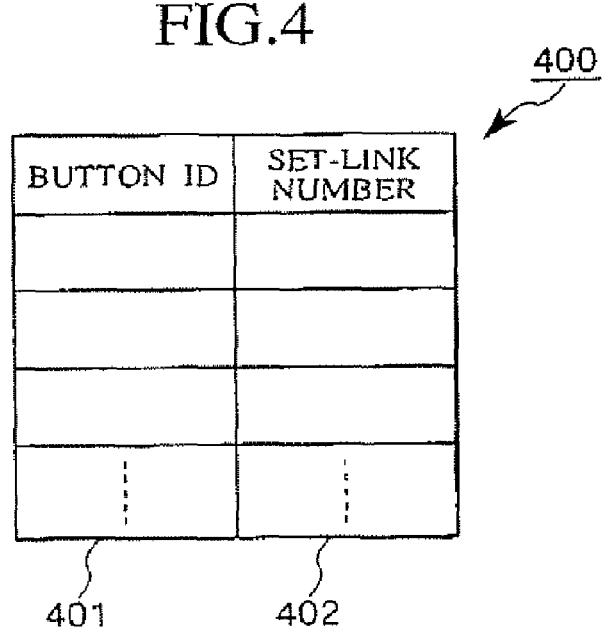
FIG. 4 is a diagram illustrating an exemplary set-link number table for registering set-link numbers of individual buttons included in a menu screen in a developmental model according to the first embodiment of the invention.

The development support tool 112 has a table 400 of a set-link number (the number of links set for the buttons) which registers the number of right link 306, left link 307, up link 308, or down link 309 of other buttons are set as the next destination button of the anchor 210 for each button. The development model 1a stores the set-link number table 400 in a predetermined area of the main memory 102. FIG. 4 is a diagram illustrating the set-link number table 400.

As illustrated in the figure, for each of the buttons 201 to 209, a button ID 401 and a set-link number 402 are associated with each other in the set-link number table 400. For each button manually set by an administrator or automatically set by the development support tool 112 as the right link 306, left link 307, up link 308, or down link 309 of another button, a set-link number 402 corresponding to the button ID 401 is incremented by one.

A button, which corresponds to the button ID 401 whose set-link number at a time when the right link 306, the left link 307, the up link 308 and the down link 309 are automatically set for all buttons is 0, becomes a button to which the anchor is not pointed to by manipulation of the direction keys if nothing is done. Resetting of the links is carried out in such a way that the button is set as the next destination button of the anchor 210 at the right link 306, left link 307, up link 308 or down link 309 of another button, The resetting of the links will be discussed in detail later.

Figure 5:
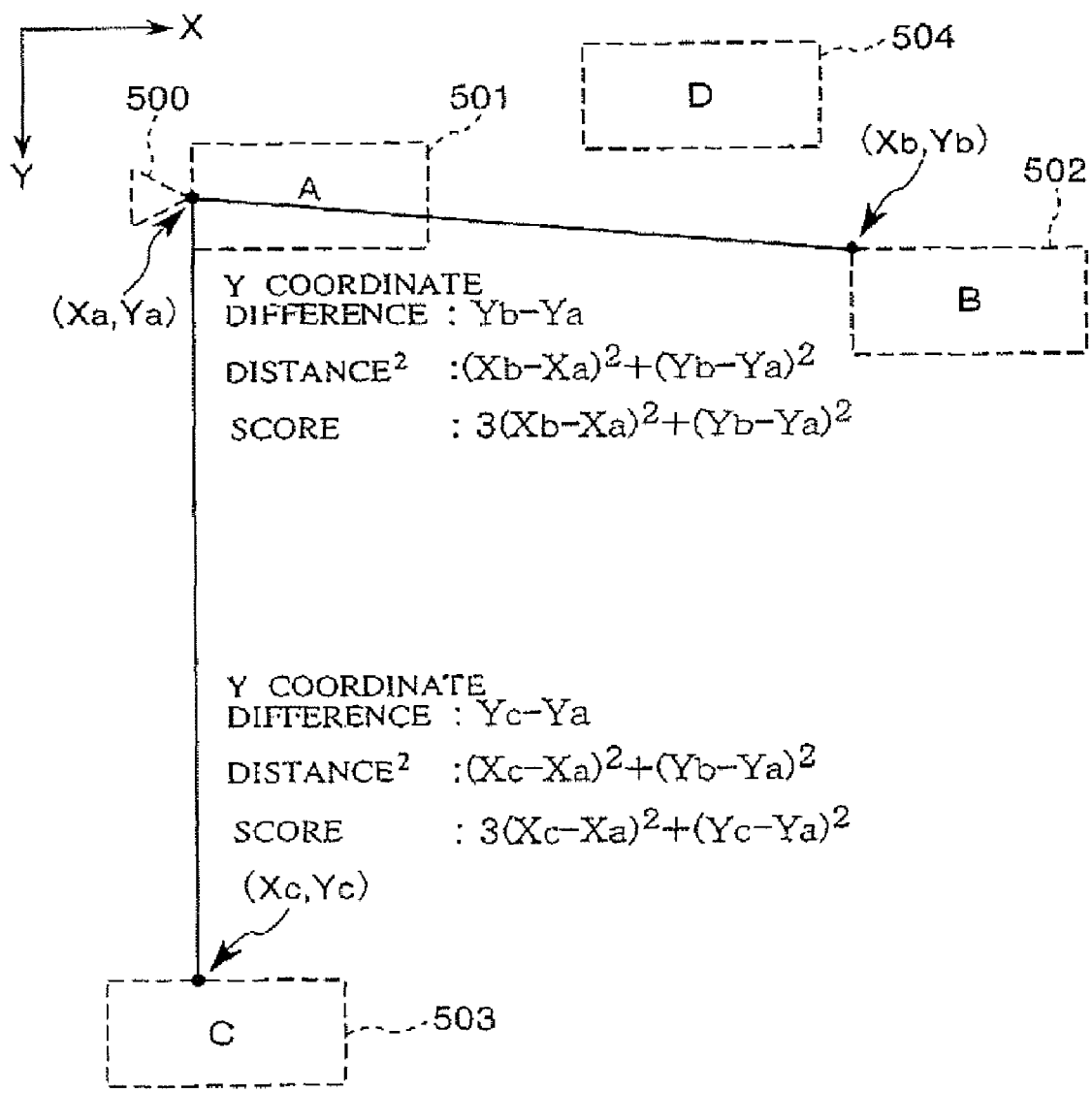
FIG. 5 is an exemplary diagram illustrating a scheme of automatically setting a right link, a left link, an up link, and a down link to each button included in the menu screen in the development model according to the first embodiment of the invention.

The scheme of automatically setting the right link 306, left link 307, up link 308 and down link 309 of each button by the development support tool 112 will now be explained in detail. FIG. 5 is an exemplary diagram illustrating the scheme of automatically setting the right link 306, left link 307, up link 308 and down link 309 of each button. To facilitate the explanation, FIG. 5, illustrates a menu screen 200 including four buttons A501, B502, C503, and D504. A case where the down link 309 of the button A501 is set will be explained as an example.

A position where an anchor 500 points to the button A501, that is, the central position of the left side of the button A501 is defined as the anchor position of the button A501. The coordinates of the anchor position of the button A501 are (Xa, Ya). Within the range of the button D504, a Y coordinate is smaller than the Y coordinate Ya of the anchor position of the button A501. As the button D504 is positioned above the anchor position (Xa, Ya) of the button A501, the button D504 will not be set as the down link 309 of the button A501.

Within the range of the button B502 and that of the button C503, points whose Y coordinates are greater than the Y coordinate Ya of the anchor position of the button A501 are included. It is determined that the button B502 and the button C503 are positioned below the anchor position (Xa, Ya) of the button A501, so that those buttons become candidates to be set as the down link 309 of the button A501. The coordinates (Xb, Yb) of the position of a point which lies at the shortest distance from the anchor position of the button A501 within the range of the button B502 (hereinafter, shortest point of button B502) are acquired. The coordinates (Xc, Yc) of the position of a point which lies at the shortest distance from the anchor position (Xa, Ya) of the button A501 (hereinafter, shortest point of button C503) are acquired (here, Xc=Xa).

For each of the button B502 and the button C503, a score of a positional relationship to the anchor position of the button A501 is determined. Since the positional relationship from the button A501 to the button B502 is for the case of setting the down link 309, the score of the positional relationship of the button B502 to the anchor position of the button A501 is acquired as $3(Xb-Xa)^2+(Yb-Ya)^2$ in accordance with an equation 5 to be discussed later. The score of the positional relationship of the button C503 to the anchor position of the button A501 is acquired as $3(Xc-Xa)^2+(Yc-Ya)^2$ in accordance with the later-discussed equation 5.

The difference (Yb−Ya) between the Y coordinate Yb of the shortest point of the button B502 and the Y coordinate Ya of the anchor position of the button A501 is smaller than the difference (Yc−Ya) between the Y coordinate Yc of the shortest point of the button C503 and the Y coordinate Ya of the anchor position of the button A501. The distance between the shortest point (Xb, Yb) of the button B502 and the anchor position (Xa, Ya) of the button A501 is shorter than the distance between the shortest point (Xc, Yc) of the button C503 and the anchor position (Xa, Ya) of the button A501. The score of the positional relationship of the button C503 to the anchor position of the button A501 is smaller than the score of the positional relationship of the button B502 to the anchor position of the button A501. The button C503 having a small positional relationship score is set as the down link 309 of the button A501.

Likewise the down link 309, the right link 306, left link 307, or up link 308 of the button A501 is set in accordance with the scores of the positional relationships of the other buttons to the anchor position of the button A501. The score of the positional relationship used when the up link 308 is to be set is calculated in accordance with the same equation as that of the score of the positional relationship used when the down link 309 is set. The score of the positional relationship used when the right link 306 or the left link 307 is to be set is calculated in accordance with an equation different from that of the score of the positional relationship used when the up link 308 or the down link 309 is to be set.

Provided that the coordinates of the anchor postion of a button for which the right link 306, the left link 307, the up link 308 or the down link 309 is to be set (hereinafter, target button) are (Xs, Ys), and the coordinates of the position of a point within the range of another button lying at the shortest distance from the anchor position (Xs, Ys) are (Xo, Yo). The score of the positional relationship used when the right link 306 or the left link 307 is to be set is calculated in accordance with an equation 4. The score of the positional relationship used when the up link 308 or the down link 309 is to be set is calculated in accordance with the equation 5.

$$(Xo-Xs)^2+(Yo-Ys)^2 \qquad (4)$$

$$3(Xo-Xs)^2+(Yo-Ys)^2 \qquad (5)$$

Any other buttons that do not include a point having a larger X coordinate than the X coordinate Xs of the anchor position of the target button within the ranges of those buttons are not set as the right link 306 of the target button. Any other buttons that do not include a point having a smaller X coordinate than the X coordinate Xs of the anchor position of the target button within the ranges of those buttons are not set as the left link 307 of the target button. Any other buttons that do not include a point having a smaller Y coordinate than the Y coordinate Ys of the anchor position of the target button within the ranges of those buttons are not set as the up link 308 of the target button, Any other buttons that do not include a point having a larger y coordinate than the Y coordinate Ys of the anchor position of the target button within the range of those buttons are not set as the down link 309 of the target button.

The score of the positional relationship is calculated in accordance with the anchor position of the target button and the position of the shortest points within the other buttons. The score of the positional relationship is not calculated in accordance with the anchor position of the target button and the anchor positions of the other buttons, For example, in a case where the up link 308 of the button G207 shown in FIG. 2 is set, if the score of the positional relationship is calculated in accordance with the anchor position of the button G207 and the anchor position of another button, the scores of the positional relationships of the button C203 and the button D204 to the anchor position of the button T207 becomes smaller than that of the button F206. However, the score of the positional relationship of the button F206 calculated in accordance with the anchor position of the button G207 and the shortest point of the button F206 becomes smaller than those of the button C203 and the button D204. The button F206 is set as the up link 308 of the button G207.

Explanation will now be given of the scheme of resetting the right link 306, the left link 307, the up link 308, and/or the down link 309 by the development support tool 112 in a case where a button is not pointed to by the anchor 210 by manipulation of the direction keys. A button subject to a process of setting as the right link 306, the left link 307, the up link 308, or the down link 309 of another button by the resetting is a button of the reference origin. In practice, only buttons whose set-link number 402 in the set-link number table 400 is 0 becomes the process target, and such buttons are called reference origin 0 buttons Any button other than the button of the reference origin is a button of the reference destination.

For example, if the set-link number 402 of another button set as the right link 306 of the button of the reference destination is greater than or equal to 2, the right link 306 of the button of the reference destination can be changed to the reference origin 0 button. For the left link 307 up link 308, or down link 309 of the button of the reference destination, if the set-link numbers 402 of other buttons set to those links are greater than or equal to 2, the left link 307, up link 308 or down link 309 can be changed to the reference origin 0 button. The right link 306, the left link 307, the up link 308 or the down link 309 which can change another registered button to the reference origin 0 button is called a changeable link. Multiple buttons may have changeable links in some cases.

If there is one changeable link, the reference origin 0 button is registered as the changeable link. If there are two or more changeable links, the score of the positional relationship of the reference origin 0 button to the anchor position of the button of each reference destination including the changeable links is acquired. The reference origin 0 button is registered as a changeable link having the smallest acquired score of the positional relationship.

An exemplary process to be executed by the computer device 1 of the embodiment will now be explained. The process according to the embodiment includes a process that the development machine 1a runs with the development support tool 112 to create an executable program 111. The process according to the embodiment also includes a process that the user model 1b executes with the execution program 111 created by the development machine 1a Likewise the user model 1b, and the development machine 1a can run the execution program 111.

A process to be executed by the development machine 1a will be explained, The development machine 1a stores the development support tool 112 in the HDD 105 beforehand. The CPU 101 of the development machine 1a runs the development support tool 112 stored in the HDD 105 to create the execution program 111. The execution program 111 under creation or the completed execution program 111 is stored in the HDD 105.

In a process of creating the execution program 111, a process of setting the right link 306, the left link 307, the up link 308, and the down link 309 for each button included in the menu screen 200 relates to the invention. Setting of the button ID 301, the button name 302, and the process link 303 for each button is completed first. The upper left position 304 and the button size 305 may be manually set by the developer, but may not be set in some cases. Hereinafter, explanation will be given of a case where the upper left position 304 and the button size 305 are set for each of the buttons 201 to 209, and then the right link 306, left link 307, up link 308 and down link 309 are set.

In the following explanation, a link destination means another button whose ID is set to each of the right link 306, the left link 307, the up link 308 and the down link 309 included in the button data 300 of each of the buttons 201 to 209, A link origin means a button in which the right link 306, the left link 307, the up link 308 or the down link 309 are about to be set.

Figure 6:
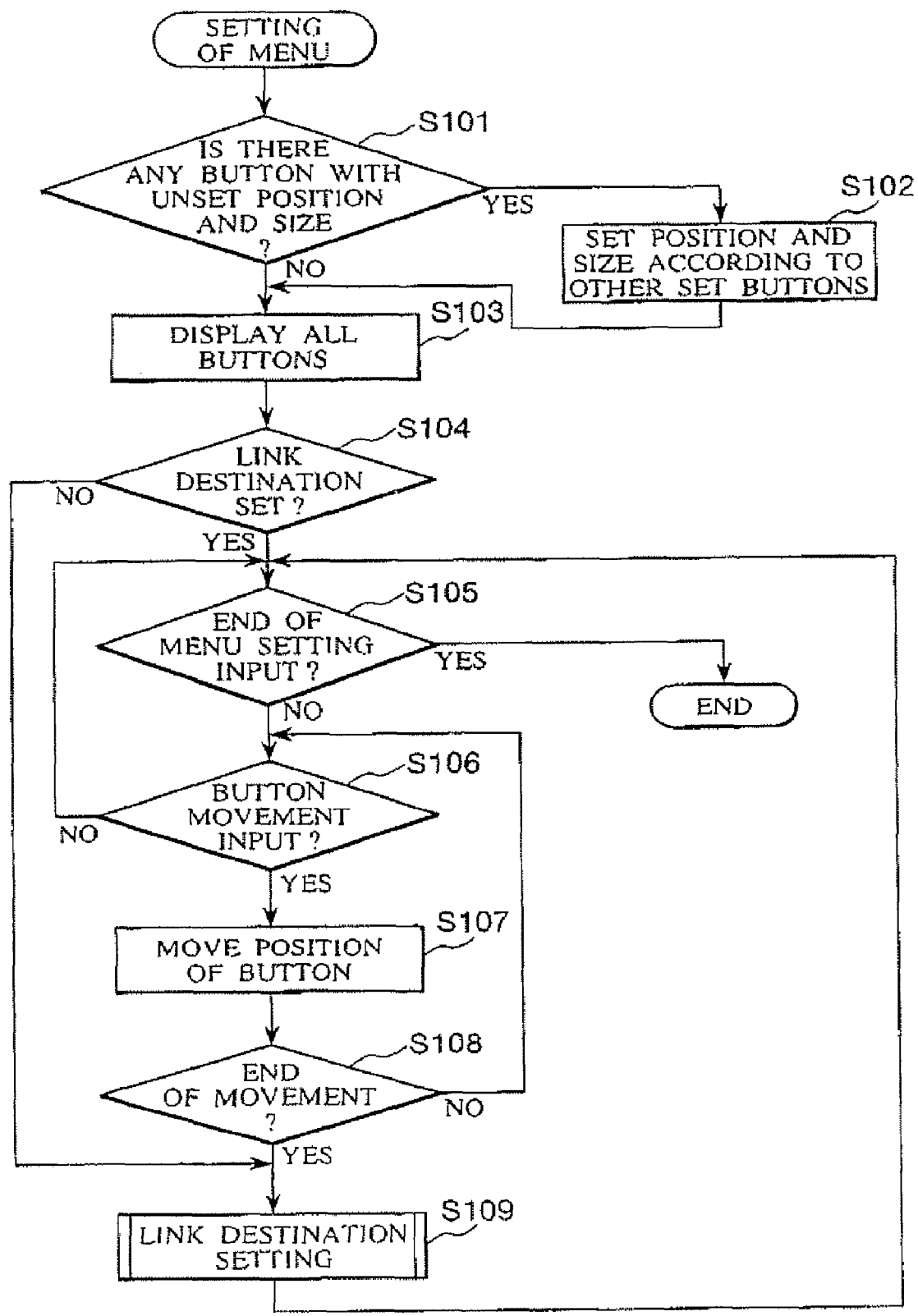
FIG. 6 is a flowchart illustrating an exemplary menu setting routine to be executed by the development model in detail according to the first embodiment of the invention.

FIG. 6 is a flowchart illustrating a menu setting routine. As the menu setting process starts, the CPU 101 determines whether or not the button data 300 of buttons 201-209 included in the executable program 111 under development, stored in the HDD 105, includes any button whose upper left position 304 and/or button size 305 are not set (step S101). When there is no button whose upper left position 304 and/or button size 305 are not set, the process proceeds to step S103.

When there is a button whose upper left position 304 and/or button size 305 are not set, the CPU 101 refers to the upper left positions 304 and button sizes 305 of other buttons, and sets the upper left position 304 and button size 305 of the button in such a way that the button does not overlap the other buttons. The button size 305 is normally set to a default size. When the menu screen 200 has no empty area, the button size 305 is set to a size smaller than the default size (step S102). The process proceeds to step S103.

In step S103, the CPU 101 causes the display device 104 to display all the buttons 201-209 included in the menu screen 200 according to the button name 302, the upper left position 304 and the button size 305.

The CPU 101 determines whether or not all of the right link 306, the left link 307, the up link 308 and the down link 309 are set to every one of the buttons 201-209 (step S104). When there is a button to which the right link 306, the left link 307, the up link 308 and/or the down link 309 is not set, the process proceeds to step S 109.

When there is no button to which the right link 306, the left link 307, the up link 308 and/or the down link 309 is not set, the CPU 101 determines whether or not an input instructing to end menu setting is entered through the input device 103 (step S105). When such an input is not entered, the CPU 101 determines whether or not an input instructing to move the position of some button is entered through the input device 103 (step S106). When there is no input instructing to move the position of some button, the process returns to step S105.

When there is an input instructing to move the position of some button, the CPU 101 moves the position of that button according to the input, and displays the position on the display device 104 (step S107). The CPU 101 determines whether or not inputting of the instruction to move the position of some button through the input device 103 is finished (step S108). When inputting of the instruction to move the position of some button through the input device 103 is not finished, the process returns to step S106. When inputting of the instruction to move the position of some button through the input device 103 is finished, the process proceeds to step S109.

In step S109, the CPU 101 performs a link destination setting process which will be explained in detail later, and sets the right link 306, the left link 307, the up link 308 and the down link 309 which are not set to each of the buttons 201-209. When the link destination setting process is finished, the process returns to step S105. When an input to end menu setting is made in step S105, the menu setting process is terminated.

Figure 7:
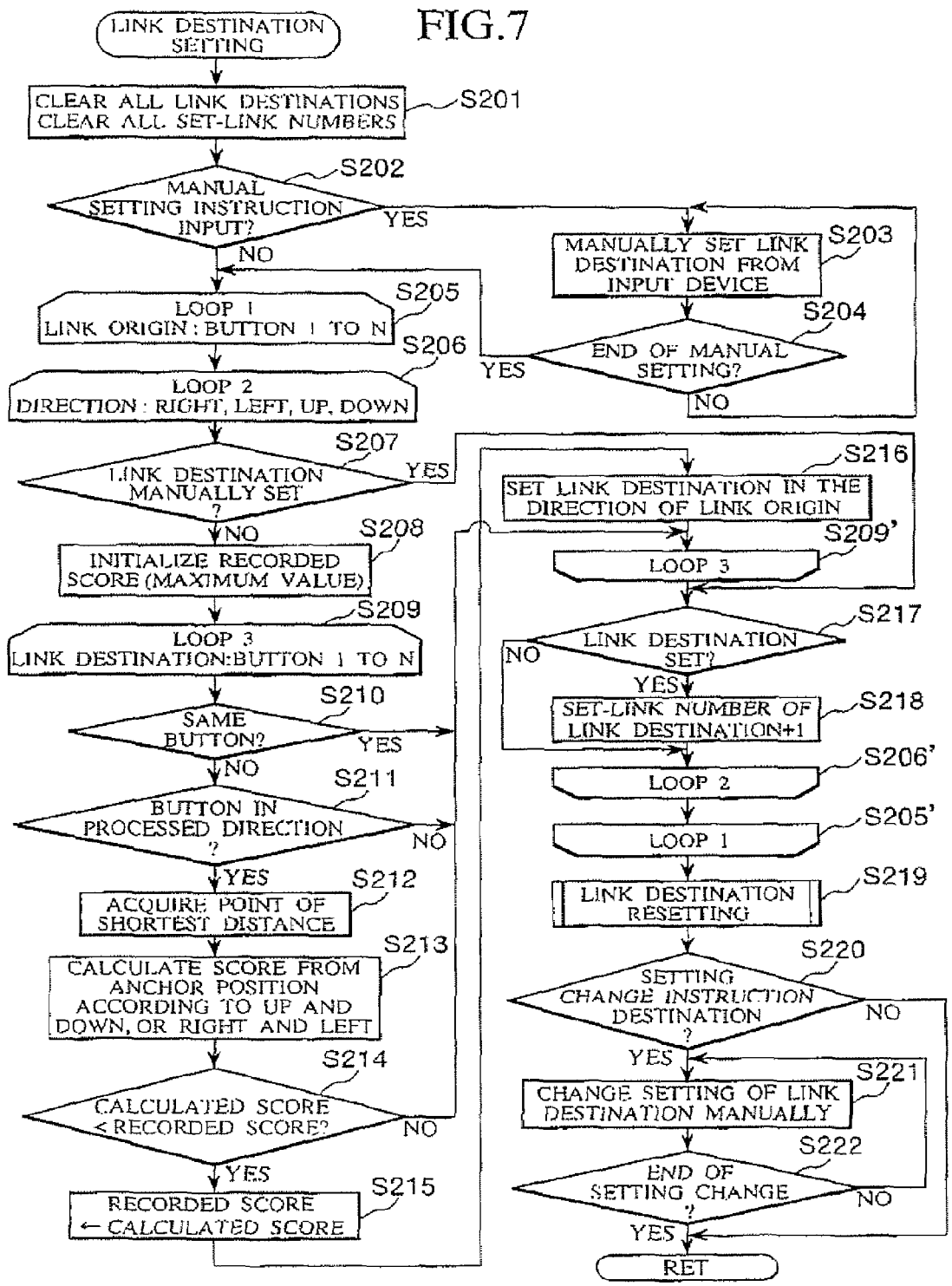
FIG. 7 is a flowchart illustrating an exemplary link destination setting process.

FIG. 7 is a flowchart illustrating the details of the link destination setting process of step S109. The CPU 101 clears the right link 306, the left link 307, the up link 308 and the down link 309 included in the button data 300 of each of the buttons 201-209. Clearing the right link 306, the left link 307, the up link 308 and the down link 309 means registration of predetermined data indicating that other buttons are not set as link destinations to the right link 306, the left link 307, the up link 308 and the down link 309, The CPU 01 clears the number of link destinations of all the buttons registered in the set-link number table 400 to 0 (step S201).

The CPU 101 determines whether or not an instruction to start manual setting of the right link 306, the left link 307, the up link 308 or the down link 309 for some button has been entered through the input device 103 (step S202). When there is no such an instruction, the process proceeds to step S205.

When the instruction to start manual setting of the right link 306, the left link 307, the up link 308 or the down link 309 is input, the CPU 101 further stands by for an instruction to designate the button of the link origin, the link of the direction in which a link destination is to be set (the right link 306, the left link 307, the up link 308 or the down link 309), and the button of the link destination to be input through the input device 103. When those pieces of data are input, the CPU 101 registers the button ID 301 of the button of link destination to the link of the direction of the button of the link origin (step S203).

The CPU 101 determines whether or not an instruction to end the manual setting of the link destination has been input through the input device 103 (step S204). When such an instruction has not been input, the process returns to step S203. When such an instruction has been input, the process proceeds to step S205.

The CPU 101 performs a loop 1 process while changing the button of the link origin to be the process target from the button 1 to the button N (the buttons 201-209 in the example in FIG. 2) one by one (steps S205-S205'). In the loop 1 process, the CPU 101 performs a loop 2 process while changing the direction to be the process target for setting the link destination with respect to the button of the link origin to be processed, in the order of the right link 306, the left link 307, the up link 308 and the down link 309 (steps 8206-S206').

In the loop 2 process, the CPU 101 determines whether or not the button of the link destination has already been manually set in the link of the direction to be processed of the button of the link origin to be processed (step S207). When the button of the link destination has already been manually set, the process proceeds to step S218. When the button of the link destination has not been manually set, the CPU 101 initializes the recorded score stored in the main memory 102 to a maximum value (step S208). The process proceeds to step s209.

After the process in step S209 is executed in the loop 2 process, the CPU 101 performs a loop 3 process while changing the button of the link destination to be the process target from the button 1 to the button N one by one (steps S209-S209'), In the loop 3 process, the CPU 101 determines whether or not the button of the link origin to be processed is the same as the button of the link destination to be processed (step S210). When the buttons of the link origin and the link destination are identical, the process proceeds to step S209' where it is determined whether or not to leave the loop 3.

When the buttons of the link origin and the link destination are not identical, the CPU 101 determines whether or not a point lying in the range of the button of the link destination to be processed is in the range toward the direction to be the processed from the anchor position of the link origin button to be processed (step S211). When a point lying in the range of the button of the link destination to be processed is not in the range of the direction to be processed, the process proceeds to step S209' where it is determined whether or not to leave the loop 3.

When a point lying in the range of the button of the link destination to be processed is included in the range of the direction to be the target process, the CPU 101 acquires a point of the shortest distance within the button of the link destination to be processed from the anchor position of the button of the link origin to be processed (step 8212).

The CPU 101 calculates the score of the positional relationship of the button of the link destination to be the processed with respect to the anchor position of the button of the link origin to be processed according to the equation 4 when the direction to be processed is the right link 306 or the left link 307, or according to the equation 5 when the direction to be processed is the up link 308 or the down link 309 (step S213). The CPU 101 determines whether or not the calculated score of the positional relationship is smaller than the recorded score stored in the main memory 102 (step S214). When the calculated score of the positional relationship is equal to or greater than the recorded score, the process proceeds to step S209' where it is determined whether or not to leave the loop 3.

When the calculated score of the positional relationship is smaller than the recorded score, the CPU 101 stores the calculated score of the positional relationship in the main memory 102 as a new score of the positional relationship (step S215). The CPU 101 sets the button ID of the link destination to be processed to the link of the direction (the right link 306, the left link 307, the up link 308 or the down link 309) to be processed of the button of the link origin to be processed. When the button of the link origin to be processed is the button 201, the direction to be processed is the right link 306 and the button of the link destination to be processed is the button 202, for example, the button ID or the button 202 is registered in the right link 306 included in the button data 300 of the button 201 (step S216). The process proceeds to step S2091 where it is determined whether or not to leave the loop 3.

When there is no button left in the buttons 1 to N (the buttons 201-209 in the example in FIG. 2) which is not processed as the link destination of the process target, the process leaves the loop 3 (step S209'). When the process leaves the loop 3, the CPU 101 determines whether or not the button ID of another button is set in the direction (the right link 306, the left link 307, the up link 308 or the down link 309) to be processed of the link origin button to be processed (step S217). When the button ID of another button is set in the direction (the right link 306, the left link 307, the up link 308 or the down link 309) to be processed of the link origin button to be processed, the CPU 101 increments the set-link number 402 corresponding to the button ID 401 of the other button in the set-link number table 400 by 1 (step 8218). The process proceeds to step S206' where it is determined whether or not to leave the loop 2. When the button ID of another button is not set in the direction to be processed of the link origin button to be processed at step S217, the process proceeds to step S206' where it is determined whether or not to leave the loop 2.

When there is nothing left in the right link 306, the left link 307, the up link 308 and the down link 309 which is not processed as the direction or the process target, the process leaves the loop 2 (step S206'). When there is no button left in the buttons 1 to N (the buttons 201-209 in the example in FIG. 2) which is not processed as the button of the link origin of the process target, the process leaves the loop 1 (step S205').

When the process leaves the loop 1, the CPU 101 performs the link destination resetting process which will be discussed in detail later in such a way that the anchor moves from any one of the buttons to the button whose set-link number 402 is 0 (step S219).

When the link destination resetting process is finished, the CPU 101 determines whether or not an instruction is received to manually change the setting of the right link 306, the left link 307, the up link 308 or the down link 309 for any one of the buttons (step S220). When there is no input of the instruction to manually change the setting of the right link 306, the left link 307, the up link 308 or the down link 309, the link destination setting process is terminated and the process returns to the menu setting routine in FIG. 6.

When the instruction to manually change the setting of the right link 306, the left link 307, the up link 308 or the down link 309 is input, the CPU 101 registers the button ID 301 of the button of the designated link destination in the designated direction or the button of the designated link origin (the right link 306, the left link 307, the up link 308 or the down link 309) according to the input from the input device 103 (step S221).

The CPU 101 determines whether or not an instruction is received to terminate manually changing of the link destination setting (step S222). When there is no input of the instruction to terminate manual setting of the link destination, the process returns to step S221. When there is an input of the instruction to terminate manually changing of the link destination setting, the link destination setting process is terminated, and the process returns to the menu setting routine in FIG. 6.

Figure 8:
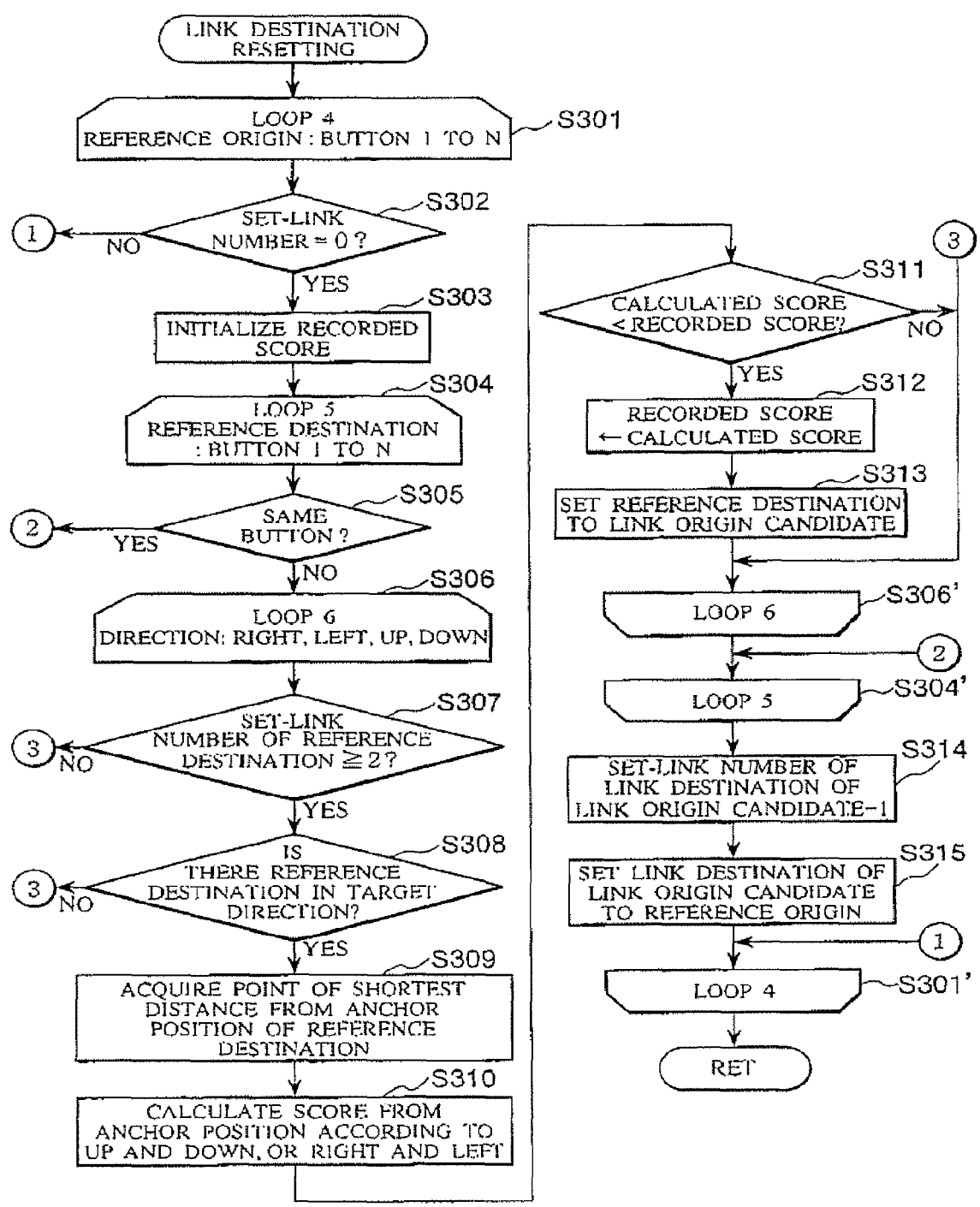
FIG. 8 is a flowchart illustrating an exemplary link destination resetting process.

FIG. 8 is a flowchart illustrating an exemplary details of the link destination resetting process of step S219. The CPU 101 performs a loop 4 process while changing buttons of reference origins to be processed from the button 1 to button N one by one (steps S301-S301'). In the loop 4 process, the CPU 101 determines whether or not the set-link number registered in the set-link number table 400 for the button of the reference origin to be processed is 0 (step S302). When the set-link number of the button of the reference origin to be processed is not 0, the process proceeds to step S301' where it is determined whether or not to leave the loop 4, When the set-link number of the button of the reference origin to be processed is 0, the button is the reference origin 0 button. The CPU 101 initializes the recorded score stored in the main memory 102 to a maximum value (step S303). The process proceeds to step S304.

After the process in step S303 is executed in the loop 4 process, the CPU 101 performs a loop 5 process while changing the buttons of the reference destinations to be processed from the button 1 to button N one by one (steps S304-S304'). In the loop 5 process, the CPU 1101 determines whether or not the button of the reference origin to be processed is the same as the button of the reference destination to be processed (step S305). When it is determined that both buttons are identical, the process proceeds to step S304' where it is determined whether or not to leave the loop 5.

When it is determined that both buttons are not identical, the CPU 101 performs a loop 6 process while changing the link of the direction to be processed in the order of the right link 306, the left link 307, the up link 308 and the down link 309 (steps S306-S306'). The link of the direction to be processed is called a process direction. In the loop 6 process, the CPU 101 determines whether or not the set-link number registered in the set-link number table 400 for another button registered in the process direction of the button of the reference destination is equal to or greater than 2 (step S307). When the set-link number is equal to or less than 1, the process proceeds to step S306' where it is determined whether or not to leave the loop 6.

When the set-link number is equal to or greater than 2, the CPU 101 determines whether or not the button of the reference origin is in the process direction with respect to the button of the reference destination. The determination of the positional relationship is made on the anchor position of the button of the reference destination and the entire range of the button of the reference origin (step S308). When the button of the reference origin is not in the process direction with respect to the button of the reference destination, the process proceeds to step S306' where it is determined whether or not to leave the loop 6.

When the button of the reference origin is in the process direction with respect to the button of the reference destination, the CPU 101 acquires a point of the shortest distance within the button of the reference origin to be processed from the anchor position of the button of the reference destination to be processed (step S309). The CPU 101 performs the equation 4 or the equation 5 depending on whether the process direction is the up and down direction or the right and left direction to calculate the score of the positional relationship of the button of the reference origin with respect to the anchor position of the button of the reference destination (step S310). The CPU 101 determines whether or not the calculated score of the positional relationship is smaller than the recorded score stored in the main memory 102 (step S311), When the calculated score of the positional relationship is equal to or greater than the recorded score, the process proceeds to step S306' where it is determined whether or not to leave the loop 6.

When the calculated score of the positional relationship is smaller than the recorded score, the CPU 101 stores the calculated score of the positional relationship in the main memory 102 as a new score of the positional relationship (step S312). The CPU 101 stores the button of the reference destination and the process direction as a link origin candidate in the main memory 102. When a link origin candidate is already stored in the main memory 102, the link origin candidate is updated (step S313). The process proceeds to step S306' where it is determined whether or not to leave the loop 6. When the process leaves the loop 6, the process proceeds to step S304' where it is determined whether or not to leave the loop 5.

When the process leaves the loop 5, the CPU 101 decrements the set-link number registered in the set-link number table 400 by 1 for the button registered to the link in the process direction of the button stored as the link origin candidate in the main memory 102 (step S314). The CPU 101 registers the button ID of the button of the reference origin to the link in the process direction of the button stored as the link origin candidate in the main memory 102. When the button of the reference origin whose set-link number is 0 is the button 206 and the left link 307 of the button 205 is stored as the link origin candidate, for example, the button ID of the button 206 is registered to the left link 307 of the button 205 (step S315). The process proceeds to step S301' where it is determined whether or not to leave the loop 4. When the process leaves the loop 4, the link destination resetting process is terminated, and the process returns to the link destination setting process in FIG. 7.

When the right link 306, the left link 307, the up link 308 and the down link 309 of each button are set through the above-described process, the button data 300 of all the buttons are provided. When creation of other parts than the button data 300 is completed, the executable program 111 is completed. The CPU 101 of the development model 1a can run the created executable program 111. The executable program 111 created in this manner and stored in the HDD 105 is written to the recording medium 121 by the CD-ROM/DVD drive 106.

In the user model 1b, the executable program 111 stored in the recording medium 121 is read by the CD-ROM/DVD drive 106 and stored in the HDD 105. The CPU 101 of the user model 1b can run the executable program 111 stored in the HDD 105.

A description will now be given of a process which is performed by the user model 1b by running the created executable program 111. The process to be explained below can also be executed by the development model 1a. A process with the menu screen 200 shown in FIG. 2 displayed will be explained as the process that is executed by running the executable program 111.

Figure 9:
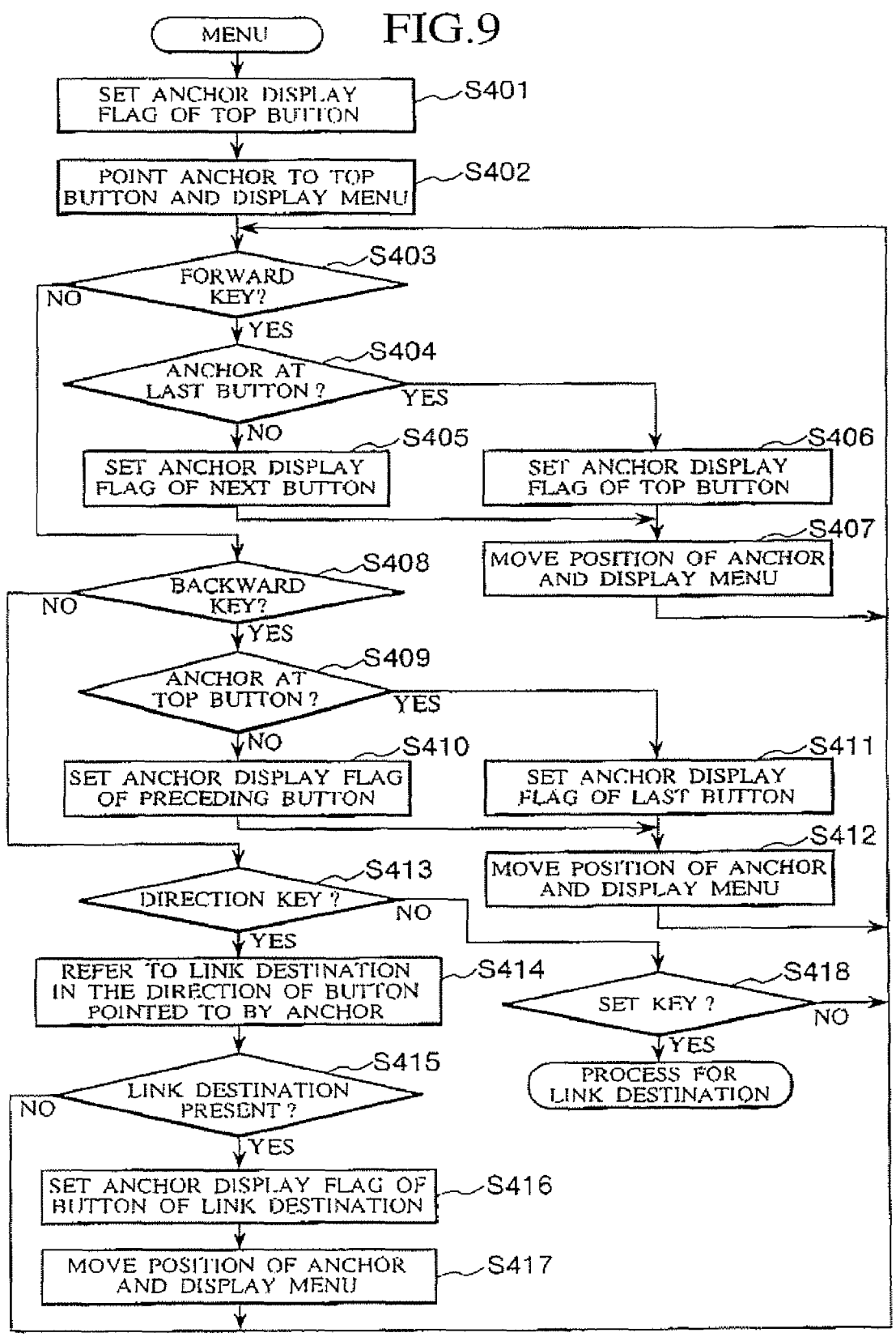
FIG. 9 is a flowchart illustrating an exemplary routine to be executed when the menu screen is displayed on a user model according to the first embodiment of the invention.

FIG. 9 is a flowchart illustrating a routine which is executed when the user model 1b displays the menu screen 200 on the display device 104. At the time of displaying the menu screen 200 on the display device 104, the CPU 101 sets the anchor display flag 310 of the button at the top position among the buttons 201-209 (button 201 in the example in FIG. 2) (step S401). The CPU 101 points the anchor 210 to the button at the top position whose anchor display flag 310 is set, and displays the buttons 201-209 on the display device 104 (step S402).

The CPU 101 determines whether or not an input from the forward key is made through the input device 103 (step S403). When an input from the forward key is made, the CPU 101 determines whether or not the button at the last position (i.e., the lower right position) among the buttons 201-209 is pointed to by the anchor 210 by checking if the anchor display flag 310 of the button at the last position is set (step S404). When the process of step S404 is performed for the first time, it is determined that the button at the last position is not pointed to by the anchor 210.

When the button at the last position is not pointed to by the anchor 210, the CPU 101 resets the anchor display flag 310 of the button currently pointed to by the anchor 210, and sets the anchor display flag 310 of a button at the next position (the button 202 if the button 201 is pointed to by the anchor 210 in the example in FIG. 2) (step S405). The process proceeds to step S407.

When the button at the last position is pointed to by the anchor 210, the CPU 101 resets the anchor display flag 310 of the button at the last position currently pointed to by the anchor 210, and sets the anchor display flag 310 of the button at the top position button (step S406). The process proceeds to step S407. In step S407, the CPU 101 moves the anchor 210 to the button whose anchor display flag 310 is newly set, and displays the buttons 201-209 on the display device 104. The process returns to step S403.

When an input from the forward key is not made, the CPU 101 determines whether or not an input from the backward key is made (step S408). When an input from the backward key is made, the CPU 101 determines whether or not the button at the top position among the buttons 201-209 is pointed to by the anchor 210 by checking if the anchor display flag 310 of the button at the top position is set (step S409).

When the button at the top position is not pointed to by the anchor 210, the CPU 401 resets the anchor display flag 310 of the button currently pointed to by the anchor 210, and sets the anchor display flag 310 of the button at the preceding position (the button 201 if the button 202 is pointed to by the anchor 210 in the example in FIG. 2) (step S410). The process proceeds to step S412.

When the button at the top position is pointed to by the anchor 210, the CPU 101 resets the anchor display flag 310 of the button at the top position currently pointed to by the anchor 210, and sets the anchor display flag 310 of the button at the last position (step S411), The process proceeds to step S412. In step S412, the CPU 101 moves the anchor 210 to the button whose anchor display flag 310 is newly set, and displays the buttons 201-209 on the display device 104. The process returns to step S403.

When an input from the backward key is not made, the CPU 101 determines whether or not an input from any of the up, down, right and left direction keys is made through the input device 103 (step S413). When there is an input from one of the up, down, right and left direction keys, the CPU 101 refers to the link in the input direction (the right link 306, the left link 307, the up link 308 or the down link 309) of the button whose anchor display flag 310 is set, i.e., the button currently pointed to by the anchor 210. When the button 201 is currently pointed to by the anchor 210 and an input from the down direction key is made, for example, the CPU 101 refers to the down link 309 of the button 201 (step S414).

The CPU 101 determines whether or not the button ID of another button is registered to the referred link (step S415). When the button ID of another button is not registered to the referred link, the process returns to step S403. In this case, the position of the anchor 210 does not move and the display status of the menu screen 200 does not change before and after an input from a direction key is made.

When the button ID of another button is registered to the referred link, the CPU 101 resets the anchor display flag 310 of the button currently pointed to by the anchor 210, and sets the anchor display flag 310 of the button that is registered to the referred link (step S416). The CPU 101 moves the anchor 210 to the button whose anchor display flag 310 is newly set, and displays the buttons 201-209 on the display device 104 (step S417). The process returns to step S403.

When an input from no direction key is made in step S413, the CPU 101 determines whether or not an input from the Set key is made through the input device 103 (step S418). When no input from the Set key is made, the process returns to step S403. When an input from the Set key is made, the CPU 101 shifts control to the process routine indicated by the process link 303 of the button pointed to by the anchor 210. As control is shifted to another process routine indicated by the process link 303 of the button pointed to by the anchor 210, the routine shown in FIG. 9 is terminated.

According to the embodiment, as explained above, the button data 300 of each of the buttons 201-209 included in the menu screen 200 includes the right link 306, the left link 307, the up link 308 and the down link 309. Registered to each of the right link 306, the left link 307, the up link 308 and the down link 309 is the button ID of another button that is the next destination of the anchor 210 when an input from a respective one of the up, down, right and left direction keys is made. In a case where an input from the right direction key is made with the anchor 210 pointing to the button 201, for example, if the button ID of another button is registered to the right link 306 of the button 201, the anchor 210 moves to the other button corresponding to the registered button ID. Even if the buttons are not regularly arranged on the menu screen 200, the anchor 210 moves through the buttons included in the menu screen 200.

When the executable program 111 is created in the development model 1a, the scores of the positional relationships of other buttons with respect to the anchor position for each button are calculated in the respective up, down, right and left directions. The right link 306, the left link 307, the up link 308 and the down link 309 of each of the buttons 201-209 are automatically set according to the scores of the positional relationships. This eliminates the need for the developer to perform a tiresome verification to set the right link 306, the left link 307, the up link 308 and the down link 309 of each of the buttons 201-209.

A button with a smaller score of the positional relationship is set to the right link 306, the left link 307, the up link 308 or the down link 309 more easily. In acquiring the right link 306 or the left link 307, the Y-directional component is evaluated as three times as great as the X-directional component. In acquiring the up link 308 or the down link 309, the X-directional component is evaluated as three times as great as the Y-directional component. As the score of the positional relationship is calculated with such weighting done, the anchor 210 easily moves to another button in a direction close to the input direction from the button currently pointed to by the anchor 210, but does not easily move to a far button even when that button is in a direction close to the input direction. The anchor 210 moves according to the intention of the user as much as possible.

The equations to acquire the score of the positional relationship (equation 4 and equation 5) merely weight the Y-directional component and the X-directional component in the equation to acquire the distance between the anchor position of the button of the link origin and a point of the shortest distance from the anchor position within the range of another button of the link destination, The score of the positional relationship can be calculated by relatively simple computation. As the score of the positional relationship is calculated using the position of a point of the shortest distance from the anchor position within the range of another button of the link destination, the score of the positional relationship can be calculated adequately even if the buttons 201-209 differ from one another in shape and/or size. As the score of the positional relationship is calculated using the anchor position of the button of the link origin, the anchor 210 is moved to the button that is located at the most adequate position from the position of the anchor 210.

While the right link 306, the left link 307, the up link 308 and the down link 309 of each of the buttons 201-209 can be automatically set according to the scores of the positional relationships, the links may be set manually beforehand. When there are multiple buttons whose assigned processes are associated with one another, therefore, the right link 306, the left link 307, the up link 308 and the down link 309 of each of the buttons can be set by priority over those of the other buttons. This can allows the user to select the processes assigned to the buttons 201-209 more easily.

When the right link 306, the left link 307, the up link 308 and the down link 309 of each of the buttons 201-209 are automatically set according to the scores of the positional relationships, a button to which the anchor 210 does not move may be generated on the menu screen 200 depending on an input from a direction key of the input device 103. The development support tool 112 is provided with the set-link number table 400. If there still is a button whose set-link number 402 is 0 after all the right link 306, the left link 307, the up link 308 and the down link 309 are automatically set for all of the buttons 201 to 209, the link destination resetting process is executed in such a way that the anchor 210 is also moved to that button.

In the link destination resetting process, the score of the positional relationship is calculated in a way similar to the way of calculating the score in the case of automatically setting the right link 306, the left link 307, the up link 308 or the down link 309 with the button whose set-link number 402 is 0 being the reference origin and each of the directions of the other buttons being the reference destination. According to the score of the positional relationship, the button whose set-link number 402 has been 0 is set as the link destination to the right link 306, the loft link 307, the up link 308 or the down link 309 of any one of the other buttons. The anchor 210 moves to the button whose set-link number 402 has been 0 before the link destination resetting process from the adequate direction.

The right link 306, the left link 307, the up link 308 or the down link 309 to which the button whose set-link number 402 has been 0 in the link destination resetting process is limited to that of the button which is registered as the link destination before the link destination resetting process and whose set-link number 402 is equal to or greater than 2. This prevents the occurrence of the problem that a button whose set-link number 402 is 0 is newly generated after the link destination resetting process is performed.

After the link destination resetting process is finished, the developer can manually change the setting of the right link 306, the left link 307, the up link 308 and/or the down link 309 of each of the buttons 201-209 again. When there multiple buttons whose assigned processes are associated with one another, therefore, the right link 306, the left link 307, the up link 308 and the down link 309 of each of the buttons can be set by priority over those of the other buttons. This can allows the user to select the processes assigned to the buttons 201-209 more easily.

The positions of the buttons 201-209 on the menu screen 200 can be changed as needed during development of the executable program 111. When the position of any button is changed, the right link 306, the left link 307, the up link 308 and the down link 309 of each of the buttons 201-209 are set again based on the new position of the button. Accordingly, adequate other buttons are always set as link destinations to the right link 306, the left link 307, the up link 308 and the down link 309 of each of the buttons 201-209.

Figure 10:
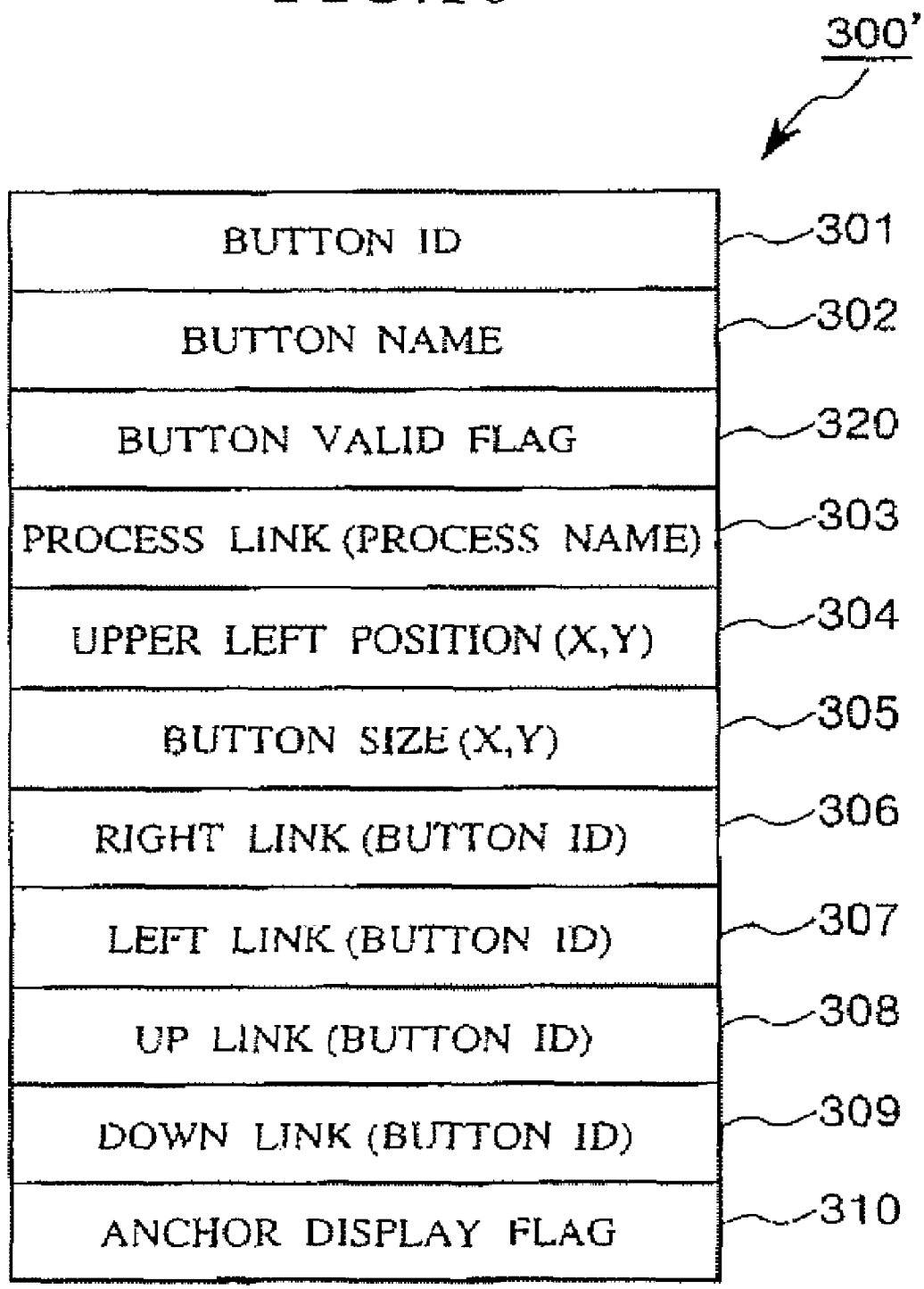
FIG. 10 is a diagram illustrating an exemplary data structure of each button included in a menu screen according to a second embodiment of the invention.
Figure 11:
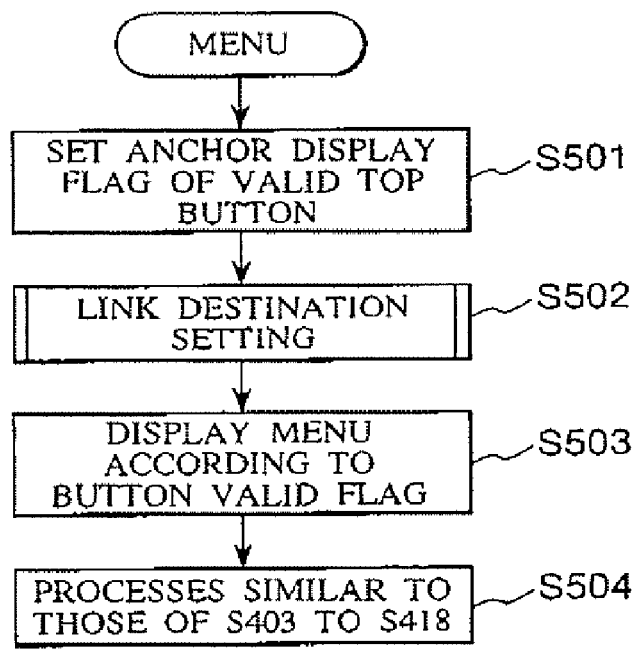
FIG. 11 is an exemplary flowchart illustrating a routine to be executed when the menu screen is displayed according to the second embodiment of the invention.
Figure 12:
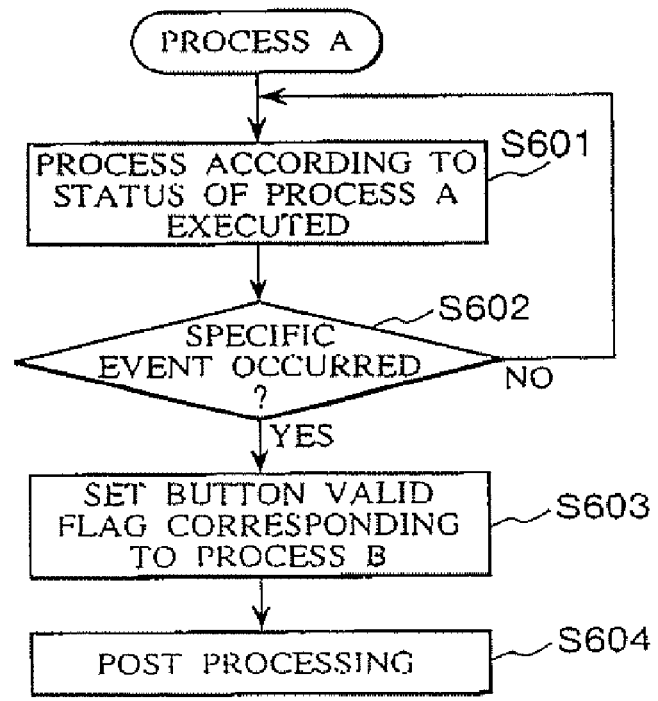
FIG. 12 is a flowchart illustrating a routine including a process of switching over an unselectable button included in the menu screen to a selectable button according to the second embodiment of the invention.

Referring to FIG. 10 to FIG. 12, a second embodiment of the invention will be described.

In the first embodiment, the right link 306, the left link 307, the up link 308 and the down link 309 of each of the buttons 201-209 included in the menu screen 200 are set in the development stage of the executable program 111. The processes that are assigned to the buttons 201-209 to be displayed on the menu screen 200 are selectable at any time by the user of the user model 1b.

It is to be noted that the processes assigned to all the buttons included in the menu screen may be made selectable by the user according to the execution status of the program. The menu screen may include a button to which a process unselectable by the user is assigned. There may be some processes which cannot be selected by the user. If the anchor moves to a button to which a non-selectable process is assigned, the user will be confused about whether the process assigned to the button is selectable or not. The following description of the second embodiment will be given of a case of generating the menu screen 200 on which the anchor 210 is moved only among buttons to which executable processes are assigned.

According to the second embodiment, the right link 306, the left link 307, the up link 308 and the down link 309 of each of the buttons 201-209 included in the menu screen 200 are not preset in the development stage. The right link 306, the left link 307, the up link 308 and the down link 309 of each of the buttons 201-209 are set at the time of running the executable program 111. In button data 300' (see FIG. 10) of the buttons 201-209, the button ID 301, the button name 302, the process link 303, the upper left position 304, and the button size 305 are preset in the development stage, and are included as data in the executable program 111 stored in the recording medium 121. The set-link number table 400 shown in FIG. 4 is generated by the executable program 111 and is stored in the main memory 102.

FIG. 10 is a diagram showing the data structure of the buttons 201-209 included in the menu screen 200 according to the embodiment. The button data 300' prepared for each of the buttons 201-209 include a button valid flag 320 in addition to the button ID 301, the button name 302, the process link 303, the upper left position 304, the button size 305, the right link 306, the left link 307, the up link 308, the down link 309, and the anchor display flag 310.

The button ID 301, the button name 302, the process link 303, the upper left position 304, and the button size 305 are the same as those of the first embodiment, and are preset in the development stage. The right link 306, the left link 307, the up link 308, the down link 309, and the anchor display flag 310 are set by the executable program 111 at the time of displaying the menu screen 200 on the display device 104. The button valid flag 320 is set when a process assigned to the associated button is selectable, and is reset when the process assigned to the associated button can not be selected.

The following description of the embodiment will be given of a process which is executed by the executable program 111 in the user model 1b. The processes relating to the invention during execution of the executable program 111 are a process of displaying the menu screen 200 on the display device 104, and a process of validating (making the assigned process selectable) or invalidating (making the assigned process can not be selected) each of the buttons 201-209 included in the menu screen 200. Only those two processes will be discussed below.

FIG. 11 is a flowchart illustrating a routine which is executed when the menu screen 200 is displayed on the display device 104 according to the embodiment. The CPU 11 sets the anchor display flag 310 of a button located at the top position among those buttons whose button valid flags 320 are set (step S501). The CPU 101 performs the link destination setting process, and sets the right link 306, the left link 307, the up link 308 and the down link 309 of the button whose button valid flag 320 is set (step S502).

The link destination setting process in step S502 is substantially identical to the link destination setting process shown in FIG. 7, except that the process of manually setting a link destination (steps S202-S204, and S220-S222) is not performed in the link destination setting process in step S502. In the loop 1 process, the buttons of the link origin to be processed are limited to buttons whose button valid flag 320 is set. In the loop 3 process, the buttons of the link destination to be processed are likewise limited to buttons whose button valid flag 320 is set. In the loop 4 process of the link destination resetting process which is invoked and executed in step S219, the buttons of the reference origin to be processed are limited to buttons whose button valid flag 320 is set, too. In the loop 5 process, the buttons of the reference destination to be processed are likewise limited to buttons whose button valid flag 320 is set.

When the link destination setting process is finished and the right link 306, the left link 307, the up link 308 and the down link 309 of each of the buttons 201-209 whose button valid flag 320 is set is set, the CPU 101 points the anchor 210 to the button at the top position whose anchor display flag 310 is set, and displays the buttons 201-209 on the display device 104. Those of the buttons 201-209 whose button valid flags 320 are set are displayed bright, while those of the buttons 201-209 whose button valid flags 320 are not set axe displayed dark (step S503).

When the menu screen 200 is displayed on the display device 104, the CPU 101 performs processes similar to those of steps S403-S418 in FIG. 9 (step S504). When an input from the forward key of the input device 103 is made, the anchor 210 is moved to only those buttons whose button valid flags 320 are set, in the order according to the display positions. When an input from the backward key is made, the anchor 210 is likewise moved to only those buttons whose button valid flags 320 are set, in the opposite order according to the display positions.

FIG. 12 is a flowchart illustrating a routine which includes a process of making a non-selectable button included in the menu screen as a selectable button. The flowchart shows a process A including a process of validating a button to which a process B is assigned. The CPU 101 sequentially performs processes according to the execution status of the process A (step S601). The CPU 101 determines whether or not a specific event, which validates the button to which the process B is assigned, occurs through the process executed in step S601 (step S602). When such a specific event is not generated, the process returns to step S601.

When such a specific event is generated, the CPU 101 sets the button valid flag 320 of the button to which the process B is assigned (step S603). The CPU 101 performs a predetermined post process which is defined as a process following the setting of the button valid flag 320 of the button corresponding to the process B. The post process may be a process of terminating the process A, or a process of returning to step S601 (step S604).

A process in a case of resetting the button valid flag 320 can be executed in a manner similar to that of the process illustrated in the flowchart in FIG. 12. In a process C including a process of invalidating a button to which a process D is assigned, for example, when a specific event occurs, the button valid flag 320 of the button to which the process D is assigned is reset.

According to the embodiment, as explained above, the right link 306, the left link 307, the up link 308 and the down link 309 of each of the buttons 201-209 included in the menu screen 200 are neither preset in the development stage, nor registered in the button data 300 in the development stage. The right link 306, the left link 307, the up link 308 and the down link 309 of each of the buttons 201-209 included in the menu screen 200 are set according to the scores of the positional relationships among the buttons whose button valid flags 320 are set, when the menu screen 200 is displayed on the display device 104 by the executable program 111. The processes respectively assigned to the buttons 201-209 may be selectable or not selectable depending on whether their button valid flags 320 are set.

The right link 306, the left link 307, the up link 308 and the down link 309 of each of the buttons 201-209 are set when the menu screen 200 is displayed. The buttons to be processed at the time of setting the right link 306, the left link 307, the up link 308 and the down link 309 are limited to the buttons whose button valid flags 320 are set. The buttons whose anchor display flags 310 are set according to an input from the forward key or the backward key are likewise limited to the buttons whose button valid flags 320 are set.

When an input from the forward key, the backward key or any direction key is made with the menu screen 200 displayed, the anchor 210 is moved only among buttons whose button valid flag 320 are set or whose assigned process can be executed. The display statuses of the buttons 201-209 on the menu screen 200 differ according to whether the button valid flags 320 are set or not. The user can easily grasp whether the process assigned to each of the buttons 201-209 is selectable or not without moving the anchor 210.

In the second embodiment, the set-link number table 400 is generated when the menu screen 200 is displayed by the executable program 111, and a process similar to the link destination resetting process shown in FIG. 8 is executed. It is possible to prevent the occurrence of a button to which the anchor 210 is not moved on the menu screen 200 displayed on the display device 104 merely by an input made from a direction key.

The invention is not limited to the first and second embodiments, but may be modified and adapted in various forms. Modifications of the embodiments adaptable to the invention will be described below.

In the first embodiment, every time the position of at least one of the buttons 201-209 on the menu screen 200 is changed, the link destination setting process shown in FIG. 7 is executed. The link destination setting process shown in FIG. 7 may also be executed when the button size 305 of at least one of the buttons 201-209 on the menu screen 200 is changed. It is to be noted however that when the button whose button size 305 is changed is the link origin, right link 306, the left link 307, the up link 308 and the down link 309 of the button need not be changed.

In the first and second embodiments, the shapes of the buttons 201-209 included in the menu screen 200 are all set to rectangles, However, the shapes of the buttons included in the menu screen are not limited to a rectangular shape, but may take an arbitrary shape, such as a circular shape, an elliptical shape, or a polygonal shape other than a rectangle. When the shapes of the buttons included in the menu screen are circular, for example the center position of each button should be registered in the button data 300 in place of the upper left position 304, and the radius of each button in place of the button size 305. Buttons of different shapes may be included in a single menu screen.

In the first and second embodiments, the score of the positional relationship is calculated based on the anchor position of the button of the link origin and the position of a point of the shortest distance from the anchor position within the range of the button of the link destination. The positions of buttons to be used at the time of acquiring the scores of the positional relationships among buttons are not limited to those positions mentioned. For instance, the score of the positional relationship may be calculated using specific positions of buttons of the link origin and the link destination (e.g., the upper left position 304, the barycenter position). The score of the positional relationship may be calculated using the anchor position of the button of the link destination as well as the button of the link origin. The score of the positional relationship may be acquired by acquiring points of the minimum distance therebetween within the ranges of the buttons of the link origin and the link destination, and using the positions of the points.

In the first and second embodiments, the score of the positional relationship that is used in setting the right link 306 or the left link 307 is calculated according to the equation 4. The score of the positional relationship that is used in setting the up link 308 or the down link 309 is calculated according to the equation 5. However, the equations for calculating the score of the positional relationship are not limited to the equations 4 and 5. Given that the anchor position of the button whose right link 306, left link 307, up link 308 or down link 309 is to be set is (Xs, Ys) and the position of a point of the shortest distance from the anchor position (Xs, Ys) within the ranges of the other buttons is (Xo, Yo), the score of the positional relationship is acquired according to an equation 6.

$$\alpha \times |Xo-Xs|^\gamma + \beta \times |Yo-Ys|^\gamma \quad (6)$$

where $\alpha$ and $\beta$ are constants greater than 0. When the score of the positional relationship to be used in setting the right link 306 or the left link 307 is calculated, $\alpha$ is set smaller than $\beta$. When the score of the positional relationship to be used in setting the up link 308 or the down link 309 is calculated, $\alpha$ is set greater than $\beta$. $\gamma$ is a positive integer.

The score of the positional relationship may be acquired according to an equation 7, for example.

$$\alpha/|Xo-Xs|^\gamma + \beta/|Yo-Ys|^\gamma \quad (7)$$

where $\alpha$ and $\beta$ are constants greater than 0, When the score of the positional relationship to be used in setting the right link 306 or the left link 307 is calculated, $\alpha$ is set greater than $\beta$. When the score of the positional relationship to be used in setting the up link 308 or the down link 309 is calculated, $\alpha$ is set smaller than $\beta$. $\gamma$ is a positive integer.

When the score of the positional relationship is calculated according to an equation 6, another button with the minimum score of the positional relationship for each direction is set to an associated one of the right link 306, the left link 307, the up link 308 and the down link 309 of the button of the link origin. When the score of the positional relationship is calculated according to an equation 7, another button with the maximum score of the positional relationship for each direction is set to an associated one of the right link 306, the left link 307, the up link 308 and the down link 309 of the button of the link origin.

An equation of calculating the score of the positional relationship is generally expressed by an equation 8:

$$\alpha \times f(Xo-Xs) \beta \times (Yo-Ys) \quad (8)$$

where f(k) is a function using k. The size relationship between $\alpha$ and $\beta$ in the equation which is used in calculating the score of the positional relationship to be used at the time of setting the right link 306 or the left link 307 is reversed from the size relationship in the equation which is used in calculating the score of the positional relationship to be use at the time of setting the up link 308 or the down link 309.

In the first and second embodiments, when there is a button whose set-link number 402 is 0 after the right link 306, the left link 307, the up link 308 and the down link 309 of every button are set, the button whose set-link number 402 is 0 is set to the right link 306, the left link 307, the up link 308 or the down link 309 of any one of the other buttons in the link destination resetting process. This prevents the generation of a button to which the anchor 210 is not moved by manipulating any direction key of the input device 103.

As an input from the forward key or the backward key causes the anchor 210 to move to a button whose set-link number 402 is 0, however, the link destination resetting process should not necessarily be executed. To prevent the generation of a button to which the anchor 210 is not moved by an input from any direction key, the link destination resetting process is required in the second embodiment, but may not be required in the first embodiment. This is because the developer can manually set the right link 306, the left link 307, the up link 308 and/or the down link 309 in the first embodiment.

When there is a button whose set-link number 402 is 0, it is preferable to display something to indicate the case on the menu screen 200 under development. Not only a button whose set-link number 402 is 0 may be merely displayed on the menu screen 200 under development, but also another button and link direction that can allow a button whose set-link number 402 is 0 to be set to the link destination may be displayed on the menu screen 200 under development. The button that can allow a button whose set-link number 402 is 0 to be set to the link destination is a button whose set-link number 402 is equal to or greater than 2.

As a button whose set-link number 402 is 0 and to be set to the link destination and another button and link direction that can allow a button whose set-link number 402 is 0 to be set to the link destination are displayed on the menu screen 200 in development, the developer can easily understand a link whose setting should be manually changed. Troublesome work for the manual setting is significantly reduced.

In the second embodiment, those buttons whose button valid flags 320 are set are displayed bright on the menu screen 200, while those buttons whose button valid flags 320 are not set are displayed dark. The difference between display status distinguishing whether the button valid flag 320 of each button is set or not is not limited to this measure. Those buttons whose button valid flags 320 are not set may be displayed semitransparently with respect to the background color. The button names 302 of those buttons whose button valid flags 320 are not set may not be displayed. Those buttons whose button valid flags 320 are set may be displayed on the menu screen 200, while those buttons whose button valid flags 320 are not set may not be displayed thereon.

In the second embodiments the processes corresponding to the buttons 201-209 included in the menu screen 200 are made selectable or not selectable by setting or resetting the respective button valid flags 320, but the positions of the buttons 201-209 on the menu screen 200 are not changed. The position of each of the buttons 201-209 on the menu screen 200 may be changed by an input made by the user through the input device 103 or according to the progress status of the respective process.

When the position of at least one button is changed on the menu screen 200, the right link 306, the left link 3077 the up link 308 and the down link 309 of each of the buttons 201-209 can be set again based on the positions of the buttons 201-209 including the button whose position has been changed. Even when the positions of the buttons 201-209 are changed, the right link 306, the left link 307, the up link 308 and the down link 309 of each of the buttons 201-209 are always set to the adequate states. When the position of that button whose button valid flag 320 is not set is changed, however, the right link 306, the left link 307, the up link 308 and the down link 309 of each of the buttons 201-209 need not be set again.

In the first embodiment, the development model 1a and the user model 1b are both realized by the computer devices 1 with the same hardware structure. However, the development model 1a and the user model 1b may differ from each other. For example, a game machine, a car navigation system, a digital home electronics, a cellular phone or the like may be adapted to the user model 1b, while a personal computer, a work station or the like for use in developing the executable program 111 which is run by the user model 1b may be adapted to the development model 1a.

In the first embodiment, the program of the development support tool 112 is stored in the recording medium 121, is distributed in that form, and is installed in the HDD 105 of the development model 1a. The program and data of the executable program 111 created by the development model 1a are distributed in the form of the recording medium 121 storing the program and data, and are installed in the HDD 105 of the user model 1b. In the second embodiment, the executable program 111 is stored in the recording medium 121, is distributed in that form, and is installed in the HDD 105 of the user model 1b.

The development support tool 112 in the development model 1a may be prestored in the HDD 105 and distributed in this form. The executable program 111 which is created by the development model 1a may be prestored in the HDD 105 and distributed in this form. Both the development support tool 112 and the executable program 111 may be stored on a hard disk drive provided in a server unit present in the Internet, and may be distributed to the computer devices 1 to be used as the development model 1a and the user model 1b over the Internet. In the user model 1b, for example, the program and data of the executable program 111 received from the server unit may be saved in the HDD 105 and may be loaded into the main memory 102 at the time of running the program.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A destination information setting device for setting destination information indicating a display object to which a selection pointer is to be moved, the selection pointer moving in a two dimensional display space, defined by coordinates (x, y) of an orthogonal x-y coordinate system, to a plurality of display objects displayed in the displayed space on a display device, one of the plurality of display objects being selected by a user with the selection pointer, when one item of direction information is input through an input device capable of inputting the direction information according to a positive x direction, a negative x direction, a positive y direction, or a negative y direction, the destination information setting device comprising:

a positional information storage that prestores positional information indicating the coordinates in the display space, for each of the plurality of display objects;

a destination information storage that stores the destination information indicating a destination of the selection pointer, in each of the positive x direction, the negative x direction, the positive y direction, and the negative y direction, for each of the plurality of display objects, when the direction information is input through the input device while the selection pointer is positioned thereat;

a positional score calculator that calculates scores of positional relationships in each of the positive x direction, the negative x direction, the positive y direction, and the negative y direction, for each of the plurality of display objects, in accordance with the positional information stored in the positional information storage, when difference between an x coordinate of a display object from which a score of a positional relationship to another display object is calculated and an x coordinate of the other display object is dx, and when a difference between a y coordinate of the display object from which the score of the positional relationship to the other display object is calculated and a y coordinate of the other display object is dy, by adding a value that a coefficient α is multiplied by a calculation according to dx, and a value that a coefficient β is multiplied by a calculation according to dy; and a destination information setting device that sets destination information indicating another display object having a smallest positional relationship score, as the destination in each of the positive x direction, the negative x direction, the positive y direction, and the negative y direction, for each of the plurality of display objects, according to the scores of the positional relationship calculated by the positional score calculator, and for storing the destination information in the destination information storage, wherein a correlation between magnitudes of α and β is inverted when a positional score in the positive x direction or the negative x direction is calculated and when a positional score in the positive y direction or the negative y direction is calculated, wherein the destination information setting device further comprises:

a moved information storage that stores information indicating whether each of the plurality of display objects is set as the destination of the selection pointer indicated by the destination information, the information being a number of times that each of the plurality of display objects is set as the destination of the selection pointer indicated by the destination information;

a movement disable display object determiner that determines whether information indicating a display object not set as the destination of the selection pointer is stored in the moved information storage, when destination information for all of the display objects and all of the directions is stored in the destination information storage; and a destination information change processor that performs processing for setting the display object not set as the destination, when the movement disable display object determiner determines that the information, indicating the display object not set as the destination of the selection pointer, is stored in the moved information storage, the procesor setting the display object not set as the destination as the destination of the selection pointer from one of the display objects other than the display object not set as the destination, wherein the destination information change processor comprises:

a changeable information extractor that extracts destination information of a display object where a display object having at least two destinations stored in the moved information storage is set as the destination of the selection pointer, as changeable destination information among the destination information stored in the destination information storage, when the movement disable display object determiner determines that the information indicating the display object not set as the destination of the selection pointer is stored in the moved information storage;

a second positional score calculator that calculates, when the movement disable display object determiner determines that the information indicating the display object not set as the destination of the selection pointer is stored in the moved information storage, scores of positional relationships between the display object not set as the destination of the selection pointer and each of display objects other than the display object in each of the positive x direction, the negative x direction, the positive y direction, and the negative y direction, in accordance with the positional information stored in the positional information storage; and a destination information changer that changes one item of the destination information extracted by the changeable information extractor, to another item of destination information indicating the display object not set as the destination of the selection pointer, which is indicated by the information stored in the moved information storage, as the destination of the selection pointer, and for storing the changed destination information in the destination information storage, according to the scores of the positional relationships calculated by the second positional score calculator.

2. The destination information setting device according to claim 1, wherein the positional score calculator calculates the score of the positional relationship in each of the positive x direction, the negative x direction, the positive y direction, and the negative y direction according to the following relationship $$\alpha \times dx \times dx + \beta \times dy \times dy$$

where $\alpha$ and $\beta$ are constants greater than 0, $\alpha > \beta$ when a score of a positional relationship in the positive x direction or the negative x direction is calculated, and $\alpha < \beta$ when a score of a positional relationship in the positive y direction or the negative y direction is calculated.

3. The destination information setting device according to claims 1, further comprising a shape information storage that prestores shape information capable of specifying a shape occupying a predetermined range in the display space with the positional information stored in the positional information storage, on each of the plurality of display objects, wherein the positional score calculator calculates the scores of the positional relationships between the display object and each of the display objects other than the display object in each of the positive x direction, the negative x direction, the positive y direction, and the negative y direction, in accordance with a shortest distance between display objects that is specified according to the positional information stored in the positional information storage and the shape information stored in the shape information storage, for each of the plurality of display objects.

4. The destination information setting device according to claims 1, wherein the positional score calculator calculates the scores of the positional relationships between the display object and each of the display objects other than the display object in each of the positive x direction, the negative x direction, the positive y direction, and the negative y direction, in accordance with coordinates of a position where the selection pointer is pointed to the display object and positional information of another display object stored in the positional information storage, for each of the plurality of display objects.

5. The destination information setting device according to claim 4, further comprising a shape information storage that prestores shape information capable of specifying a shape occupying a predetermined range in the display space with the positional information stored in the positional information storage, for each of the plurality of display objects, wherein the positional score calculator calculates the scores of the positional relationships between the display object and each of the display objects other than the display object in each of the positive x direction, the negative x direction, the positive y direction, and the negative y direction, in accordance with the coordinates of the position where the selection pointer is pointed to the display object, and a shortest between the selection pointer and the display object that is specified according to the positional information and shape information of the other display object, for each of the plurality of display objects.

6. The destination information setting device according to claim 1, further comprising a positional information changer that changes the positional information of the plurality of display objects stored in the positional information storage, wherein, when the positional information changer changes positional information of at least one display object, the positional score calculator calculates the scores of the positional relationships between the display object and each of the display objects other than the display object in each of the positive x direction, the negative x direction, the positive y direction, and the negative y direction, according to the changed positional information, for each of the plurality of display objects.

7. The destination information setting device according to claim 1, further comprising an external information inputter that externally inputs the destination information indicating the destination of the selection pointer in each of the positive x direction, the negative x direction, the positive y direction, and the negative y direction, for each of the plurality of display objects at the time that the direction information is input through the input device before the positional score is calculated by the positional score calculator, and for prestoring the destination information in the destination information storage, wherein the positional score calculator calculates the score of the positional relationship between a display object and a direction of the destination information which is not stored in the destination information storage by the external information inputter and another display object.

8. The destination information setting device according to claim 1, further comprising a destination information updater that externally inputs the destination information indicating the destination of the selection pointer in each of the positive x direction, the negative x direction, the positive y direction, and the negative y direction, when the direction information is input through the input device after the destination information set for each direction of each display object by the destination information setter is stored in the destination information storage, and for updating the destination information stored in the destination information storage to the input destination information.

9. The destination information setting device according to claim 1, further comprising a display object display that displays each of the plurality of display objects on the display device in accordance with the positional information stored in the positional information storage, wherein the positional score calculator calculates the scores of the positional relationships between the display object and each of the display objects other than the display object in each of the positive x direction, the negative x direction, the positive y direction, and the negative y direction, for each of the plurality of display objects, when the display object display displays the plurality of display objects on the display device.

10. The destination information setting device according to claim 9, further comprising a selectable object setter that sets a display object which the user can select by moving the selection pointer from the plurality of display objects the positional information of which is stored in the positional information storage, wherein the display object display displays the plurality of display objects to be discriminable in accordance with whether the plurality of display objects are set to be selectable by the user by the selectable object setter, wherein the positional score calculator calculates the score of the positional relationship between the display object set to be selectable by the user by the selectable object setter and another display object set to be selectable by the user other than the display object.

11. The destination information setting device according to claim 9, further comprising a positional information changer that changes the positional information of the plurality of display objects stored in the positional information storage, wherein, when the positional information changer changes positional information of at least one display object, the display object display displays the plurality of display objects on the display device according to the changed positional information.

12. A destination information setting method for setting destination information indicating a display object to which a selection pointer is to be moved, the selection pointer moving in a two dimensional display space, defined by coordinates (x, y) of an orthogonal x-y coordinate system, to a plurality of display objects displayed in the display space on a display device, one of the plurality of display objects being selected by a user with the selection pointer, when one item of direction information is input to each of the plurality of display objects through an input device capable of inputting the direction information according to a positive x direction, a negative x direction, a positive y direction, or a negative y direction, the destination information setting method being performed by a computer device having a storage device prestoring positional information indicating the coordinates in the display space, the method comprising:

calculating scores of positional relationships in each of the positive x direction, the negative x direction, the positive y direction, and the negative y direction, for each of the plurality of display objects, in accordance with the positional information stored in the storage device, when a difference between an x coordinate of a display object from which a score of a positional relationship to another display object is calculated and an x coordinate of the other display object is dx, and when a difference between a y coordinate of the display object from which the score of the positional relationship to the other display object is calculated and a y coordinate of the other display object is dy, by adding a value that a coefficient $\alpha$ is multiplied by a calculation according to dx, and a value that a coefficient $\beta$ is multiplied by a calculation according to dy;

setting destination information indicating another display object having a smallest positional relationship score, as the destination in each of the positive x direction, the negative x direction, the positive y direction, and the negative y direction, for each of the plurality of display objects, according to the calculated scores of the positional relationships; and storing the destination information set in each of the positive x direction, the negative x direction, the positive y direction, and the negative y direction, in a destination information storage area of the storage device, for each of the plurality of display objects, wherein a correlation between magnitudes of $\alpha$ and $\beta$ is inverted when a positional score in the positive x direction or the negative x direction is calculated and when a positional score in the positive y direction or the negative y direction is calculated, wherein the destination information setting comprises:

storing information indicating whether each of the plurality of display objects is set as the destination of the selection pointer indicated by the destination information, the information being a number of times that each of the plurality of display objects is set as the destination of the selection pointer indicated by the destination information, in a moved information storage area of the storage device;

determining whether information indicating a display object not set as the destination of the selection pointer is stored in the moved information storage area, when destination information for all of the display objects and all of the directions is stored in the destination information storage area; and performing processing for setting the display object not set as the destination, when it is determined that the information indicating the display object not set as the destination of the selection pointer is stored in the moved information storage area, the processing setting the display object not set as the destination as the destination of the selection pointer from one of the display objects other than the display object not set as the destination, wherein the processing comprises:

extracting destination information of a display object where a display object having at least two destinations stored in the moved information storage area is set as the destination of the selection pointer, as changeable destination information among the destination information stored in the destination information storage area, when it is determined that the information indicating the display object not set as the destination of the selection pointer is stored in the moved information storage area;

calculating a second positional score, when the determining determines that the information indicating the display object not set as the destination of the selection pointer is stored in the moved information storage area, the calculation of the second positional score calculating scores of positional relationships between the display object not set as the destination of the selection pointer and each of display objects other than the display object in each of the positive x direction, the negative x direction, the positive y direction, and the negative y direction, in accordance with the positional information stored in the positional information storage area; and changing one item of the destination information extracted in the extracting, to another item of destination information indicating the display object not set as the destination of the selection pointer, which is indicated by the information stored in the moved information storage area, as the destination of the selection pointer, and for storing the changed destination information in the destination information storage area, according to the scores of the positional relationships calculated in the second positional score calculating.

13. A computer-readable recording medium containing a program for setting destination information indicating a display object to which a selection pointer is to be moved, the selection pointer moving in a two dimensional display space, defined by coordinates (x; y) of an orthogonal x-y coordinate system, to a plurality of display objects displayed in the display space on a display device, one of the plurality of display objects being selected by a user with the selection pointer, when one item of direction information is input to each of the plurality of display objects through an input device capable of inputting the direction information according to a positive x direction, a negative x direction, a positive y direction, or a negative y direction, the program being executed by a processing unit of a computer having a storage device prestoring positional information indicating the coordinates in the display space, the program causing the computer to:

calculate scores of positional relationships in each of the positive x direction, the negative x direction, the positive y direction, and the negative y direction, for each of the plurality of display objects, in accordance with the positional information stored in the storage device, when a difference between an x coordinate of a display object from which a score of a positional relationship to another display object is calculated and an x coordinate of the other display object is dx, and that a difference between a y coordinate of the display object from which the score of the positional relationship to the other display object is calculated and a y coordinate of the other display object is dy, by adding a value that a coefficient $\alpha$ is multiplied by a calculation according to dx, and a value that a coefficient $\beta$ is multiplied by a calculation according to dy;

set destination information indicating another display object having a smallest positional relationship score as the destination in each of the positive x direction, the negative x direction, the positive y direction, and the negative y direction, for each of the plurality of display objects, according to the calculated scores of the positional relationships; and store the destination information set in each of the positive x direction, the negative x direction, the positive y direction, and the negative y direction, in a destination information storage area of the storage device, for each of the plurality of display objects, wherein a correlation between magnitudes of $\alpha$ and $\beta$ is inverted when a positional score in the positive x direction or the negative x direction is calculated and when a positional score in the positive y direction or the negative y direction is calculated, wherein the program further causes the computer to:

store information indicating whether each of the plurality of display objects is set as the destination of the selection pointer indicated by the destination information, the information being a number of times that each of the plurality of display objects is set as the destination of the selection pointer indicated by the destination information, in a moved information storage area of the storage device;

determine whether information indicating a display object not set as the destination of the selection pointer is stored in the moved information storage area, when destination information for all of the display objects and all of the directions is stored in the destination information storage area; and perform processing for setting the display object not set as the destination, when it is determined that the information indicating the display object not set as the destination of the selection pointer is stored in the moved information storage area, the processing setting the display object not set as the destination as the destination of the selection pointer from one of the display objects other than the display object not set as the destination, wherein the processing comprises:

extracting destination information of a display object where a display object having at least two destinations stored in the moved information storage area is set as the destination of the selection pointer, as changeable destination information among the destination information stored in the destination information storage area, when it is determined that the information indicating the display object not set as the destination of the selection pointer is stored in the moved information storage area;

calculating a second positional score, when it is determined that the information indicating the display object not set as the destination of the selection pointer is stored in the moved information storage area, scores of positional relationships between the display object not set as the destination of the selection pointer and each of display objects other than the display object in each of the positive x direction, the negative x direction, the positive y direction, and the negative y direction, in accordance with the positional information stored in the positional information storage area; and changing one item of the destination information extracted in the extracting, to another item of destination information indicating the display object not set as the destination of the selection pointer, which is indicated by the information stored in the moved information storage area, as the destination of the selection pointer, and for storing the changed destination information in the destination information storage area, according to the scores of the positional relationships calculated in the second positional score calculating.

14. A computer-readable recording medium that stores a program for setting destination information indicating a display object to which a selection pointer is to be moved, the selection pointer moving in a two dimensional display space, defined by coordinates (x, y) of an orthogonal x-y coordinate system, to a plurality of display objects displayed in the display space on a display device, one of the plurality of display objects being selected by a user with the selection pointer, when one item of direction information is input to each of the plurality of display objects through an input device capable of inputting the direction information according to a positive x direction, a negative x direction, a positive y direction, or a negative y direction, the program being executed by a processing unit of a computer having a storage device prestoring positional information indicating the coordinates in the display space, the computer readable recording medium comprising:

a calculating code segment that calculates scores of positional relationships in each of the positive x direction, the negative x direction, the positive y direction, and the negative y direction, for each of the plurality of display objects, in accordance with the positional information stored in the storage device, when a difference between an x coordinate of a display object from which a score of a positional relationship to another display object is calculated and an x coordinate of the other display object is dx, and that a difference between a y coordinate of the display object from which the score of the positional relationship to the other display object is calculated and a y coordinate of the other display object is dy, by adding a value that a coefficient α is multiplied by a calculation according to dx, and a value that a coefficient β is multiplied by a calculation according to dy;

a setting destination information code segment that indicates another display object having a smallest positional relationship score as the destination in each of the positive x direction, the negative x direction, the positive y direction, and the negative y direction, for each of the plurality of display objects, according to the calculated scores of the positional relationships; and a storing code segment that stores the destination information set in each of the positive x direction, the negative x direction, the positive y direction, and the negative y direction, in a destination information storage area of the storage device, for each of the plurality of display objects, wherein a correlation between magnitudes α and β is inverted when a positional score in the positive x direction or the negative x direction is calculated and when a positional score in the positive y direction or the negative y direction is calculated, wherein the computer readable recording medium further comprises:

a information storing code segment that stores information whether each of the plurality of display objects is set as the destination of the selection pointer indicated by the destination information, the information being a number of times that each of the plurality of display objects is set as the destination of the selection pointer indicated by the destination information, in a moved information storage area of the storage device;

a determining code segment that determines whether information indicating a display object not set as the destination of the selection pointer is stored in the moved information storage area, when destination information for all of the display objects and all of the directions is stored in the destination information storage area; and a change processing code segment which executes processing for setting the display object not set as the destination, when it is determined that the information indicating the display object not set as the destination of the selection pointer is stored in the moved information storage area, the change processing code segment setting the display object not set as the destination as the destination of the selection pointer from one of the display objects other than the display object not set as the destination, wherein change processing code segment comprises:

an extracting code segment that extracts destination information of a display object when a display object having at least two destinations stored in the moved information storage area is set as the destination of the selection pointer, as changeable destination information among the destination information stored in the destination information storage area, when it is determined that the information indicating the display object not set as the destination of the selection pointer is stored in the moved information storage area;

a second calculating code segment that calculates, when the determining code segment determines that the information indicating the display object not set as the destination of the selection pointer is stored in the moved information storage area, scores of positional relationships between the display object not set as the destination of the selection pointer and each of display objects other than the display object in each of the positive x direction, the negative x direction, the positive y direction, and the negative y direction, in accordance with the positional information stored in the positional information storage area; and a destination information changing code segment that changes one item of the destination information extracted by the extracting code segment, to another item of destination information indicating the display object not set as the destination of the selection pointer, which is indicated by the information stored in the moved information storage area, as the destination of the selection pointer, and for storing the changed destination information in the destination information storage area, according to the scores of the positional relationships calculated by the second calculating code segment.

15. The destination information setting device according to claims 2, further comprising a shape information storage that prestores shape information capable of specifying a shape occupying a predetermined range in the display space with the positional information stored in the positional information storage, on each of the plurality of display objects, wherein the positional score calculator calculates the scores of the positional relationships between the display object and each of the display objects other than the display object in each of the positive x direction, the negative x direction, the positive y direction, and the negative y direction, in accordance with a shortest distance between display objects that is specified according to the positional information stored in the positional information storage and the shape information stored in the shape information storage, for each of the plurality of display objects.

16. The destination information setting device according to claims 2, wherein the positional score calculator calculates the scores of the positional relationships between the display object and each of the display objects other than the display object in each of the positive x direction, the negative x direction, the positive y direction, and the negative y direction, in accordance with coordinates of a position where the selection pointer is pointed to the display object and positional information of another display object stored in the positional information storage, for each of the plurality of display objects.

17. The destination information setting device according to claim 2, further comprising a positional information changer that changes the positional information of the plurality of display objects stored in the positional information storage, wherein, when the positional information changer changes positional information of at least one display object, the positional score calculator calculates the scores of the positional relationships between the display object and each of the display objects other than the display object in each of the positive x direction, the negative x direction, the positive y direction, and the negative y direction, according to the changed positional information, for each of the plurality of display objects.

18. The destination information setting device according to claims 2, further comprising an external information inputter that externally inputs the destination information indicating the destination of the selection pointer in each of the positive x direction, the negative x direction, the positive y direction, and the negative y direction, for each of the plurality of display objects at the time that the direction information is input through the input device before the positional score is calculated by the positional score calculator, and for prestoring the destination information in the destination information storage, wherein the positional score calculator calculates the score of the positional relationship between a display object and a direction of the destination information which is not stored in the destination information storage by the external information inputter and another display object.

19. The destination information setting device according to claim 2, further comprising a destination information updater that externally inputs the destination information indicating the destination of the selection pointer in each of the positive x direction, the negative x direction, the positive y direction, and the negative y direction, when the direction information is input through the input device after the destination information set for each direction of each display object by the destination information setter is stored in the destination information storage, and for updating the destination information stored in the destination information storage to the input destination information.

20. The destination information setting device according to claims 2, further comprising a display object display that displays each of the plurality of display objects on the display device in accordance with the positional information stored in the positional information storage, wherein the positional score calculator calculates the scores of the positional relationships between the display object and each of the display objects other than the display object in each of the positive x direction, the negative x direction, the positive y direction, and the negative y direction, for each of the plurality of display objects, when the display object display displays the plurality of display objects on the display device.

21. The destination information setting device according to claims 3, further comprising a display object display that displays each of the plurality of display objects on the display device in accordance with the positional information stored in the positional information storage, wherein the positional score calculator calculates the scores of the positional relationships between the display object and each of the display objects other than the display object in each of the positive x direction, the negative x direction, the positive y direction, and the negative y direction, for each of the plurality of display objects, when the display object display displays the plurality of display objects on the display device.

22. The destination information setting device according to claim 3, further comprising a destination information updater that externally inputs the destination information indicating the destination of the selection pointer in each of the positive x direction, the negative x direction, the positive y direction, and the negative y direction, when the direction information is input through the input device after the destination information set for each direction of each display object by the destination information setter is stored in the destination information storage, and for updating the destination information stored in the destination information storage to the input destination information.

23. The destination information setting device according to claims 3, further comprising an external information inputter that externally inputs the destination information indicating the destination of the selection pointer in each of the positive x direction, the negative x direction, the positive y direction, and the negative y direction, for each of the plurality of display objects at the time that the direction information is input through the input device before the positional score is calculated by the positional score calculator, and for prestoring the destination information in the destination information storage, wherein the positional score calculator calculates the score of the positional relationship between a display object and a direction of the destination information which is not stored in the destination information storage by the external information inputter and another display object.

24. The destination information setting device according to claim 3, further comprising a positional information changer that changes the positional information of the plurality of display objects stored in the positional information storage, wherein, when the positional information changer changes positional information of at least one display object, the positional score calculator calculates the scores of the positional relationships between the display object and each of the display objects other than the display object in each of the positive x direction, the negative x direction, the positive y direction, and the negative y direction, according to the changed positional information, for each of the plurality of display objects.

25. The destination information setting device according to claims 4, further comprising a display object display that displays each of the plurality of display objects on the display device in accordance with the positional information stored in the positional information storage, wherein the positional score calculator calculates the scores of the positional relationships between the display object and each of the display objects other than the display object in each of the positive x direction, the negative x direction, the positive y direction, and the negative y direction, for each of the plurality of display objects, when the display object display displays the plurality of display objects on the display device.

\* \* \* \* \*

UNITED STATES PATENT AND TRADEMARK OFFICE
CERTIFICATE OF CORRECTION

PATENT NO. : 7,554,525 B2
APPLICATION NO. : 11/420080
DATED : June 30, 2009
INVENTOR(S) : Koji Aoyama It is certified that error appears in the above-identified patent and that said Letters Patent is hereby corrected as shown below:

At column 28, line 17 (claim 1, line 38) of the printed patent, "a" should be --α-- (first occurrence).

At column 33, line 36 (claim 13 line 31) of the printed patent, "a" should be --α-- (first occurrence).

Signed and Sealed this

Twenty-fourth Day of November, 2009

David J. Kappos
*Director of the United States Patent and Trademark Office*